US012809911B2

(12) United States Patent
Zhang et al.

(10) Patent No.: US 12,809,911 B2
(45) Date of Patent: Nov. 24, 2026

(54) PREDICTION METHOD, APPARATUS, AND SYSTEM FOR PERFORMING AN IMAGE SEARCH

(71) Applicant: Alibaba Group Holding Limited, Grand Cayman (KY)

(72) Inventors: Yanhao Zhang, Hangzhou (CN); Yun Zheng, Hangzhou (CN); Pan Pan, Hangzhou (CN); Yinghui Xu, Hangzhou (CN); Rong Jin, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 1057 days.

(21) Appl. No.: 17/147,643

(22) Filed: Jan. 13, 2021

(65) Prior Publication Data

US 2021/0216913 A1 Jul. 15, 2021

(51) Int. Cl.

*G06F 16/53* (2019.01)
*G06F 18/214* (2023.01)

(Continued)

(52) U.S. Cl.

CPC ............ *G06F 16/53* (2019.01); *G06F 18/214* (2023.01); *G06F 18/22* (2023.01); *G06F 18/2431* (2023.01); *G06N 20/00* (2019.01); *G06V 10/454* (2022.01); *G06V 10/764* (2022.01); *G06V 10/82* (2022.01); *G06Q 30/0623* (2013.01)

(58) Field of Classification Search

CPC ........ G06F 16/53; G06F 18/214; G06F 18/22; G06F 18/2431; G06F 18/24; G06N 20/00; G06N 3/045; G06N 3/08; G06V 10/454; G06V 10/764; G06V 10/82; G06V 10/40;

(Continued)

(56) References Cited

U.S. PATENT DOCUMENTS 8,352,405 B2 1/2013 Fang et al.
8,543,563 B1 9/2013 Nikoulina et al.

(Continued)

OTHER PUBLICATIONS

Baochen Sun, Kate Saenko "Deep CORAL: Correlation Alignment for Deep Domain Adaptation", arXiv:160719v1 (Year: 2016).*

(Continued)

*Primary Examiner* — Li B. Zhen
*Assistant Examiner* — Griffin Tanner Bean
(74) *Attorney, Agent, or Firm* — James J. DeCarlo; Greenberg Traurig, LLP

(57) ABSTRACT

A prediction method, apparatus, and system for performing an image search is disclosed in the disclosure. In one embodiment, a method comprises: performing training in which domain adaptation learning is performed by using a source domain model to obtain a target domain model, wherein the source domain model comprises at least two network models, and the network models respectively correspond to different commodity categories; and setting an image under search and sample sets of commodities of a plurality of categories as input parameters for the target domain model to obtain a prediction result corresponding to the image. The disclosure solves the technical problem of inaccurate prediction in the process of using category prediction methods to perform a prediction on an image in current systems.

20 Claims, 15 Drawing Sheets

(51) Int. Cl.

| | |
|---|---|
| ***G06F 18/22*** | (2023.01) |
| ***G06F 18/2431*** | (2023.01) |
| ***G06N 20/00*** | (2019.01) |
| ***G06V 10/44*** | (2022.01) |
| ***G06V 10/764*** | (2022.01) |
| ***G06V 10/82*** | (2022.01) |
| *G06Q 30/0601* | (2023.01) |

(58) Field of Classification Search
CPC .... G06V 10/469; G06V 10/761; G06V 10/70; G06V 10/698; G06Q 30/0623
See application file for complete search history.

(56) References Cited

U.S. PATENT DOCUMENTS

| | | | |
|---|---|---|---|
| 8,713,037 | B2 | 4/2014 | Nikoulina et al. |
| 9,153,142 | B2 | 10/2015 | Bagchi et al. |
| 9,443,320 | B1 | 9/2016 | Gaidon et al. |
| 9,633,483 | B1 | 4/2017 | Xu et al. |
| 9,710,729 | B2 | 7/2017 | Chidlovskii et al. |
| 9,785,855 | B2 | 10/2017 | Soldevila et al. |
| 9,916,522 | B2 | 3/2018 | Ros Sanchez et al. |
| 10,095,950 | B2 * | 10/2018 | Krishnakumar ....... G06V 20/00 |
| 10,296,846 | B2 | 5/2019 | Csurka et al. |
| 10,713,574 | B2 | 7/2020 | Baughman et al. |
| 10,825,219 | B2 | 11/2020 | Fu et al. |
| 2016/0350336 | A1 | 12/2016 | Checka et al. |
| 2017/0147944 | A1 * | 5/2017 | Csurka ..................... G06N 3/02 |
| 2017/0357720 | A1 | 12/2017 | Torabi et al. |
| 2018/0165554 | A1 | 6/2018 | Zhang et al. |
| 2018/0253627 | A1 * | 9/2018 | Baradel ............. G06F 18/24133 |
| 2019/0325299 | A1 * | 10/2019 | Oliveira Pinheiro .... G06N 3/08 |
| 2020/0184307 | A1 | 6/2020 | Lipka et al. |
| 2021/0089872 | A1 * | 3/2021 | Gan ....................... G06N 3/045 |

OTHER PUBLICATIONS

Kang, Guoliang, et al. "Contrastive adaptation network for single- and multi-source domain adaptation." IEEE transactions on pattern analysis and machine intelligence 44.4 (2020): 1793-1804. (Year: 2020).*

Dietterich, Thomas G. "Ensemble methods in machine learning." International workshop on multiple classifier systems. Berlin, Heidelberg: Springer Berlin Heidelberg, 2000. (Year: 2000).*

* cited by examiner

PREDICTION METHOD, APPARATUS, AND SYSTEM FOR PERFORMING AN IMAGE SEARCH

CROSS-REFERENCE TO RELATED APPLICATIONS

This application claims the benefit of priority of Chinese Application No. 202010036600.9, filed on Jan. 14, 2020, which is hereby incorporated by reference in its entirety.

BACKGROUND

Technical Field

The disclosure relates to the field of image searching, and in particular, to a prediction method, apparatus, and system for performing an image search.

Description of the Related Art

An e-commerce platform is an electronic platform established on the Internet to conduct commercial activities. Currently, e-commerce platforms can be used for business negotiations between enterprises as well as for general commodity transactions. In the context of commodity transactions, e-commerce platforms have large-scale and diversified commodity databases and thus need to manage commodities in these databases. Usually, an e-commerce platform manages the commodities in the commodity database via image searching. Image feature extraction (i.e., image vectorization) is the first step of image searching, and similar commodities may be identified by the e-commerce platform via efficient feature vector indexing. Therefore, the quality of the image feature vectorization determines whether the entire search system is successful in searching.

E-commerce platforms use different network models to extract features for different commodity categories with an aim to improve search accuracy. These network models usually have identical structures but use different categories of data-specific training, thus having different model parameters. For example, FIG. 1 is a diagram of an image search performed by existing e-commerce technology. As illustrated in FIG. 1, after an image under search is input, a category prediction is first performed on the image under search using a convolutional neural network (CNN) model to determine a network model for performing feature extraction on an image under search. As shown in FIG. 1, the network model for performing feature extraction on the image under search includes a clothing model, a shoe model, a bag model, and a miscellaneous model. After the network model is determined, feature extraction is performed on the image under search via the determined network model, and finally, a search result corresponding to the image under search is obtained based on the extracted features.

However, the final search result of the above solution depends on category prediction. If the result of the category prediction is incorrect, for example, the input image under search is clothing, but the network model corresponding to the category prediction is a shoe model, then when feature extraction is performed on the image of clothing under search, the shoe model is used to perform the feature extraction, and the obtained features may be inaccurate, resulting in errors in the search result for the image. Currently, no effective solution has been proposed to address the above problem.

SUMMARY

A prediction method, apparatus, and system for performing an image search are provided in embodiments of the disclosure so as to at least solve the technical problem of inaccurate prediction in the process of using category prediction methods to perform a prediction on an image in current systems.

In one embodiment, a prediction method for performing an image search is provided. The method comprises: performing training in which domain adaptation learning is performed by using a source domain model to obtain a target domain model, wherein the source domain model comprises at least two network models, and the network models respectively correspond to different commodity categories; and setting an image under search and sample sets of commodities of a plurality of categories as input parameters for the target domain model to obtain a prediction result corresponding to the image.

In one embodiment, a prediction method for performing an image search is provided, comprising: acquiring an image under search and sample sets of commodities of a plurality of categories; performing category prediction processing on the image under search and the sample sets of commodities of a plurality of categories by using a target domain model to obtain a plurality of candidate results; and selecting, from the plurality of candidate results, a prediction result to be outputted; wherein the target domain model is a network model obtained by training in which domain adaptation learning is performed by using a source domain model, the source domain model comprises at least two network models, and the network models respectively correspond to different commodity categories.

In another embodiment, according to the embodiments of the disclosure, a prediction apparatus for performing an image search is further provided, comprising: a training module, configured to perform training in which domain adaptation learning is performed by using a source domain model to obtain a target domain model, wherein the source domain model comprises at least two network models, and the network models respectively correspond to different commodity categories; and a processing module, configured to set an image under search and sample sets of commodities of a plurality of categories as input parameters for the target domain model to obtain a prediction result corresponding to the image under search.

In one embodiment, an image searching method is provided, comprising: acquiring an image under search; inputting the image under search into a target-domain machine learning model, wherein the target-domain machine learning model is generated by training at least based on a source-domain machine learning model; acquiring a feature of the image under search via the target-domain machine learning model; and providing, as feedback, an image search result corresponding to the image under search based on the feature.

In one embodiment, an image processing method is provided, comprising: acquiring an image under search; inputting the image under search into a first granularity machine learning model, wherein the first granularity machine learning model is generated by training at least based on a second granularity machine learning model, the second granularity machine learning model comprises a plurality of machine learning sub-models, and the machine learning sub-models respectively correspond to different commodity categories; acquiring a feature under search of the image under search via the first granularity machine learning model; and obtaining an image search result corresponding to the image under search based on the feature under search.

In one embodiment, a network model fusion method is provided, comprising: acquiring an initial granularity machine learning model, wherein the initial granularity machine learning model comprises a plurality of machine learning sub-models, and the machine learning sub-models respectively correspond to different commodity categories; and performing fusion processing on at least some of the plurality of machine learning sub-models to generate a target granularity machine learning model, wherein the target granularity machine learning model is used to obtain an image search result corresponding to the image under search based on the feature under search in the image under search.

In another embodiment, according to the embodiments of the disclosure, a storage medium is further provided, the storage medium comprising a stored program, wherein when the program is run, a device where the storage medium is located is controlled to perform the above prediction method for performing an image search.

In another embodiment, according to the embodiments of the disclosure, a processor is further provided, the processor being configured to run a program, wherein when the program is run, the above prediction method for performing an image search is performed.

In another embodiment, according to the embodiments of the disclosure, a prediction system for performing an image search is further provided, comprising: an input device, configured to input an image under search into a target domain model, wherein the target domain model is a model obtained by training in which domain adaptation learning is performed by using a source domain model, and the source domain model comprises at least two network models, and the network models respectively correspond to different commodity categories; a processing device, configured to perform a unified feature extraction on the image under search based on the target domain model to obtain a plurality of candidate results, perform voting processing on the plurality of candidate results, and select a category having the most votes as a prediction result corresponding to the image under search; and a display device, configured to display the prediction result.

In one embodiment, a target domain model is obtained by training in which a domain adaptation learning-based method is adopted to perform domain adaptation learning via a source domain model, and an image under search and sample sets of commodities of a plurality of categories are set as input parameters for the target domain model to obtain a prediction result corresponding to the image under search.

As illustrated, the disclosure uses a unified model for different commodity categories. That is, the disclosed embodiments use the target domain model to perform a prediction on the image under search. Compared with current systems, the disclosure not only improves the storage efficiency of the system but also improves the generalization ability of the target domain model. In addition, the disclosure does not use category prediction to determine a model for performing a prediction on the image under search, and instead, the disclosure uses domain self-learning to perform a prediction on the image under search by using sample sets of commodities of a plurality of categories. Therefore, the disclosure can also avoid the problem of inaccurate prediction caused by using category prediction methods to perform a prediction on an image in current systems, thus improving the accuracy of the prediction.

As illustrated, the solutions provided by the disclosure achieve the objective of accurately performing a prediction on the image under search, thereby achieving the technical effect of improving the accuracy of performing a prediction on the image under search, and further solving the technical problem of inaccurate prediction in the process of using category prediction methods to perform a prediction on an image in current systems.

BRIEF DESCRIPTION OF THE DRAWINGS

The drawings described herein provide a further understanding of the disclosed embodiments and constitute a part of the disclosure. Embodiments of the disclosure and the description thereof are used to explain the disclosure instead of constituting improper limitations to the disclosure.

DETAILED DESCRIPTION

To enable those skilled in the art to better understand the solutions of the disclosure, the technical solutions in the embodiments of the disclosure will be described below with reference to the drawings in the embodiments of the disclosure. The described embodiments are merely some rather than all of the embodiments of the disclosure. Based on the embodiments of the disclosure, all other embodiments obtained by those of ordinary skill in the art without making creative efforts shall fall within the protection scope of the disclosure.

It should be noted that the terms "first," "second," and the like in the description and claims of the disclosure and in the above drawings are used to distinguish similar objects and are not necessarily used to describe a specific sequence or order. It should be understood that these numbers may be interchanged where appropriate so that the embodiments of the disclosure described herein can be implemented in orders other than those illustrated or described herein. In addition, the terms "include" and "have" and any variations thereof are intended to cover non-exclusive inclusions. For example, processes, methods, systems, products, or devices that include a series of steps or units are not limited to steps or units that are clearly listed but may include other steps or units not clearly listed or inherent to these processes, methods, products, or devices.

First, explanations of some terms used in the description of the embodiments of the disclosure are provided as follows. The following explanations are not intended to limit the scope of the terms of the disclosure or the disclosure itself. A convolutional neural network (CNN) may comprise a deep learning method for image recognition. In some embodiments, domain adaptation refers to mapping data distributed in different source domains and target domains to a feature space so that distances therebetween in the feature space are as close as possible, so as to transfer a target function for source domain training in the feature space to the target domain, thus improving the accuracy of the target domain prediction. In one embodiment, domain adaptation learning is a representative method in transfer learning, which refers to the use of information-rich source domain samples to improve the performance of the target domain model.

Embodiment 1

In one embodiment, a prediction method is disclosed for performing an image search. It should be noted that the steps shown in the flowchart of the accompanying drawings may be performed in a computer system by, for example, a set of computer-executable instructions. Moreover, although the logical order is shown in the flowchart, in some cases, the steps shown or described may be performed in an order different from that described here.

Figure 1:
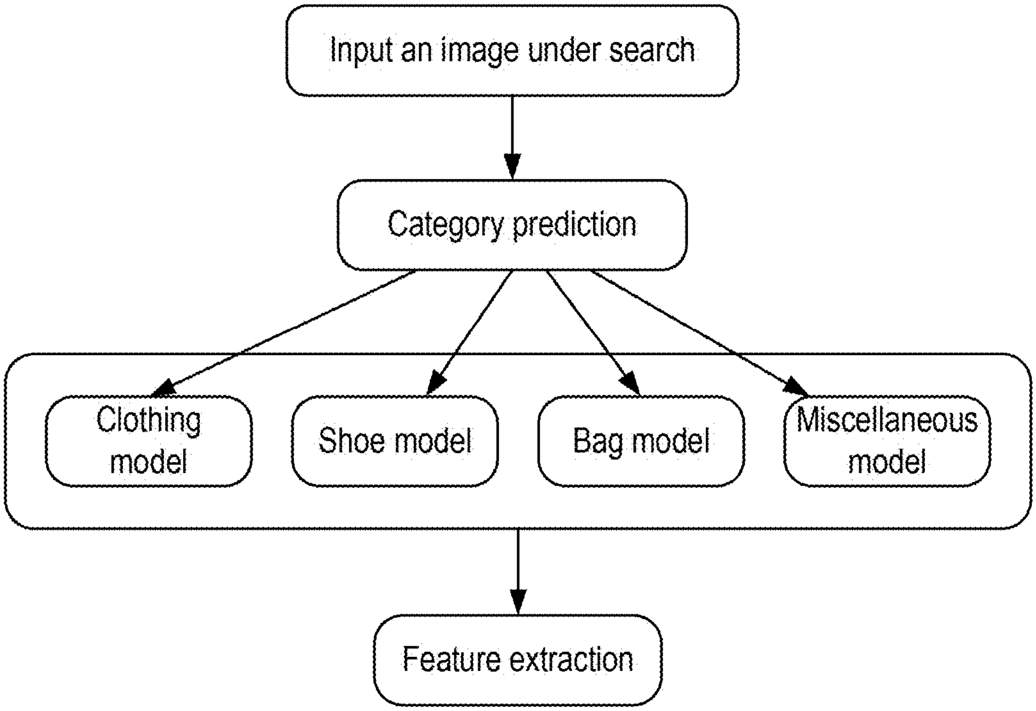
FIG. 1 PRIOR ART
FIG. 1 is a diagram of an image search performed by existing e-commerce technology.
Figure 2:
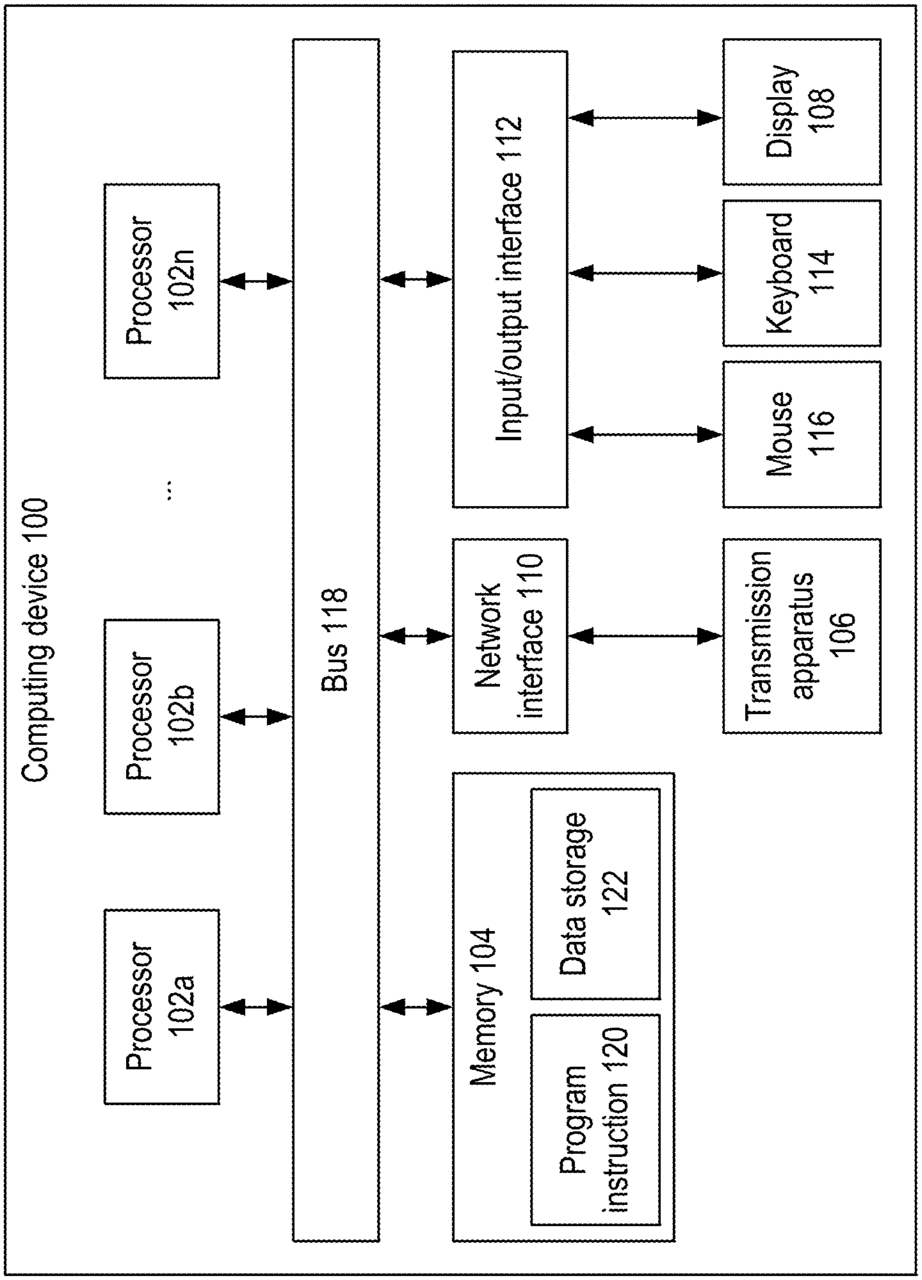
FIG. 2 is a block diagram of a computing device for executing a prediction method for performing an image search according to some embodiments of the disclosure.

The method embodiment provided in Embodiment 1 of the disclosure may be performed in a mobile terminal, a computing device, or other similar computing apparatuses. FIG. 2 is a block diagram of a computing device (or a mobile device) for executing a prediction method for performing an image search. As shown in FIG. 2, a computing device or mobile device 100 may include one or a plurality of processors 102*a*, 102*b*, . . . 102*n* (collectively referred to as processors 102). In the illustrated embodiment, a given processor may include but is not limited to a processing apparatus such as a microprocessor (MCU) or a field-programmable gate array (FPGA). The illustrated device 100 includes a memory 104 configured to store data (122) and program instructions (120). The device 100 may further include a transmission apparatus 106 configured for communication functions. In addition, it may also include a display 108, an input/output (I/O) interface 112, a universal serial bus (USB) port (which may be included as one port among ports of the I/O interface), a network interface 110, a power supply, and/or a camera. Each device may communicate over a bus 118. A person of ordinary skill in the art can understand that the structure shown in FIG. 2 is only for illustration and does not limit the structure of the above electronic apparatus. For example, the computing device 100 may also include more or fewer components (including keyboard 114 and mouse 116) than those shown in FIG. 2 or have a different configuration from that shown in FIG. 2.

It should be noted that the above one or a plurality of processors 102 and/or other data processing circuits may generally be referred to as "data processing circuits" herein. The data processing circuit may be embodied in whole or in part as software, hardware, firmware, or any other combination thereof. In addition, the data processing circuit may be a single independent processing module or may be fully or partially integrated into any one of the other elements in the computing device 100 (or mobile device). As involved in this embodiment of the disclosure, the data processing circuit is used as a processor for controlling (e.g., controlling a selection of a variable resistance terminal path connected to an interface).

Memory 104 may be used to store software programs and modules of application software, such as program instructions (120) or data storage (122) corresponding to the method In one embodiment. The processor 102 runs the software programs and modules stored in memory 104 to perform various functional applications and data processing, that is, to implement the above prediction method for performing an image search. Memory 104 may include a high-speed random access memory (RAM) and may also include non-volatile memory such as one or a plurality of magnetic storage apparatuses, a flash memory, or other non-volatile solid-state memories. In some examples, memory 104 may further include memories remotely provided with respect to the processor 102, and these remote memories may be connected to the computing device 100 via a network. Examples of the aforementioned network include, but are not limited to, the Internet, intranets, local area networks, mobile communication networks, and the combinations thereof.

The transmission apparatus 106 is configured to receive or send data via a network. A specific example of the above network may include a wireless network provided by a communication provider of the computing device 100. In one embodiment, the transmission apparatus 106 includes a network adapter (e.g., network interface controller), which may be connected to another network device via a base station to communicate with the Internet. In one embodiment, the transmission apparatus 106 may be a radio frequency (RF) module, which is configured to communicate with the Internet in a wireless manner.

The display may, for example, be a touch-sensitive liquid crystal display (LCD), and the LCD may enable a user to interact with a user interface of the computing or mobile device 100.

It should be noted here that, in some alternative embodiments, the computer or mobile device shown in FIG. 2 may include a hardware element (including a circuit), a software element (including computer code stored in a computer-readable medium), or a combination of hardware and software elements. It should be noted that FIG. 2 is only one example of a particular example and is intended to show types of components that may exist in the above computer or mobile device.

Figure 3:
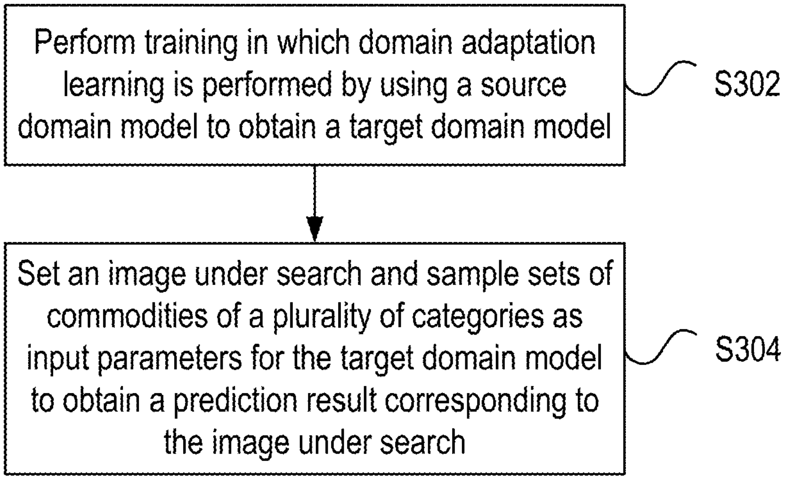
FIG. 3 is a flow diagram illustrating a prediction method for performing an image search according to some embodiments of the disclosure.

In the above operating environment, a prediction method for performing an image search, as shown in FIG. 3 is provided in the disclosure, wherein a server may be used as the operator of the method. In an alternative embodiment, a terminal device (e.g., a PC or a smartphone) may also be used as the execution subject of this embodiment. It should be noted that this embodiment uses the server as the operator of the method, solely for explanatory purposes and other devices may be used to execute the methods described herein. Alternatively, FIG. 3 is a flowchart of the prediction method for performing an image search according to Embodiment 1 of the disclosure. As illustrated in FIG. 3, the method includes the following steps.

Step S302: perform training in which domain adaptation learning is performed by using a source domain model to obtain a target domain model, wherein the source domain model comprises at least two network models, and the network models respectively correspond to different commodity categories.

Figure 4:
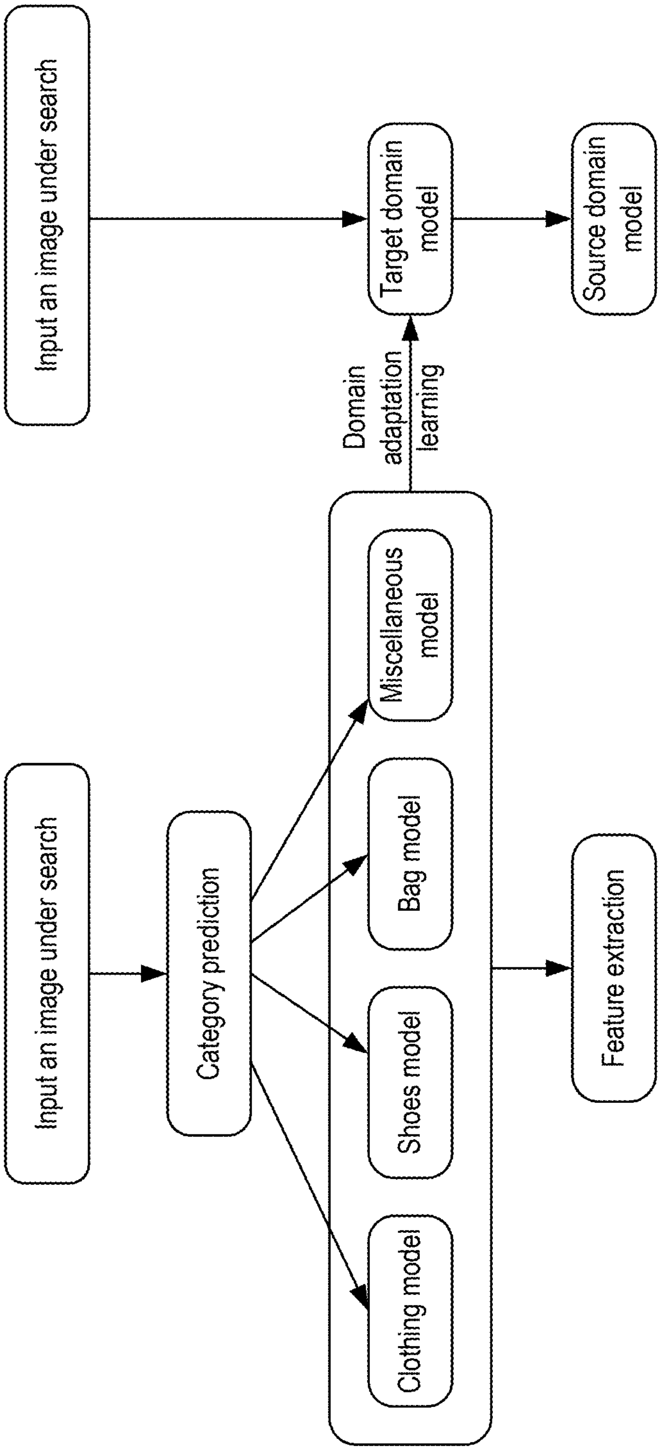
FIG. 4 is a flow diagram illustrating a prediction method for performing an image search according to some embodiments of the disclosure.

In an alternative embodiment, FIG. 4 depicts a flow diagram illustrating a prediction method for performing an image search. As illustrated in FIG. 4, the source domain model includes four network models: a clothing model, a shoe model, a bag model, and a miscellaneous model. In the disclosure, the server learns the above four network models into a unified model, i.e., the target domain model, via domain adaptation learning.

It should be noted that a plurality of network models may also correspond to the same commodity category. For example, the commodity category corresponding to a network model 1 and a network model 2 is clothing. In addition, a plurality of commodity categories may also correspond to the same network model. For example, a network model corresponding to commodity categories such as clothing, shoes, and bags may be an apparel network model. Similarly, a network model corresponding to commodity categories such as mobile phone, watch, camera, and computer may be a digital electronics network model.

In addition, it should be noted that domain adaptation learning is a type of transfer learning, which can map data features in different domains to the same feature space. As shown in FIG. 4, the four network models (clothing, shoe, bag, and miscellaneous) are mapped to the target domain model, which can effectively solve the problem of changes in data distribution among domains and reduce distribution differences among domains.

As illustrated, the domain adaptation learning is used to map a plurality of network models of the source domain model to the target domain model, and therefore, there is no need to perform a category prediction on the image under search, thereby avoiding the problem of incorrect prediction results caused by category prediction errors.

Step S304: set an image under search and sample sets of commodities of a plurality of categories as input parameters for the target domain model to obtain a prediction result corresponding to the image.

Figure 5:
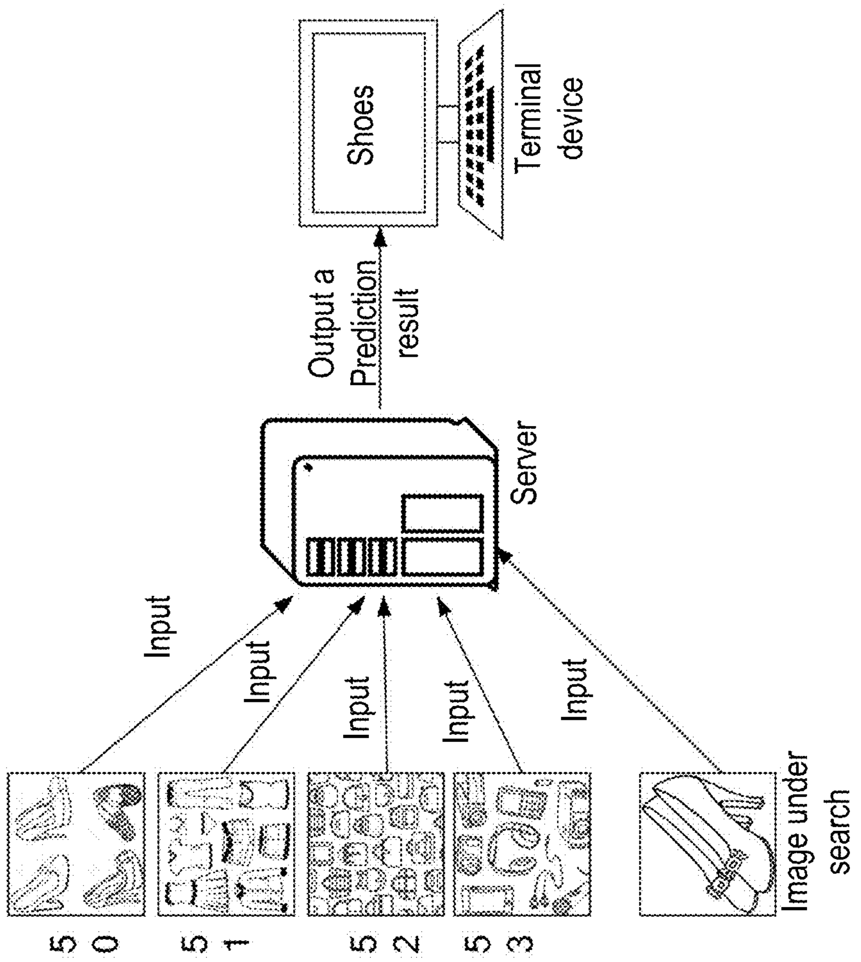
FIG. 5 is a flow diagram of a prediction method based on image searching according to some embodiments of the disclosure.

In an alternative embodiment, FIG. 5 is a flow diagram of a prediction method based on image searching, wherein elements 51, 52, 53, and 54 represent sample sets of commodities of different categories. Alternatively, 50 is a shoe sample set, 51 is a clothing sample set, 52 is a bag sample set, and 53 is a miscellaneous sample set. In addition, as illustrated in FIG. 5, the image under search and the sample sets of commodities of a plurality of categories may be input into the target domain model of the server via a terminal device, and then the target domain model of the server performs feature extraction on the image under search and the sample sets of commodities of a plurality of categories, to obtain a prediction result of the prediction of the image under search.

For example, in FIG. 5, the image under search is predicted, and the obtained prediction result indicates that the image under search is shoes. At this time, the server may acquire the prediction result and push the prediction result to the terminal device. The user may use a display screen of the terminal device to acquire the prediction result corresponding to the image under search. For example, text information “shoes” corresponding to the prediction result is displayed in the terminal device in FIG. 5. Further, after the prediction result corresponding to the image under search is determined, the user may manage the image under search according to the prediction result. For example, in a commodity classification management scenario, the image under search may be classified into the shoe sample set. When a buyer performs a search for shoes on an e-commerce platform, the image under search may be presented.

Based on the solution defined in steps S302 through S304 above, a target domain model is obtained by training in which a domain adaptation learning-based method is adopted to perform domain adaptation learning via a source domain model, and an image under search and sample sets of commodities of a plurality of categories are set as input parameters for the target domain model to obtain a prediction result corresponding to the image under search.

In the illustrated embodiment, the disclosure uses a unified model for different commodity categories; that is, the disclosed embodiments use the target domain model to perform a prediction on the image under search. Compared with current systems, the disclosure not only improves the storage efficiency of the system but also improves the generalization ability of the target domain model. In addition, the disclosure does not use category prediction to determine a model for performing a prediction on the image under search, and instead, the disclosure uses domain self-learning to perform a prediction on the image under search by using sample sets of commodities of a plurality of categories. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search and further solving the technical problem of inaccurate prediction in the process of using category prediction methods to perform a prediction on an image in current systems.

In an alternative embodiment, the server needs to acquire the target domain model before performing a prediction on the image under search. Specifically, the server initializes the target domain model by using a model pre-trained by using an image data set to obtain initial model parameters, then inputs sample image data to the source domain model and target domain model respectively to acquire a calculation result of a loss function between the source domain model and the target domain model, and finally adjusts the initial model parameters based on the calculation result to obtain target model parameters. The loss function is used to control a distance between the source domain model and the target domain model in the same feature space.

Alternatively, the initial model parameters of the target domain model may be parameters of an existing CNN structure but having different parameter values. The initial model parameters of the target domain model may include but are not limited to a batch parameter, a learning rate parameter, the size of a convolution kernel, the number of convolutional layers, and so on.

It should be noted that when the loss function is the smallest, it indicates that the distance between the source domain model and the target domain model is the smallest in the same feature space. At this time, a parameter model corresponding to the target domain model when the loss function is the smallest is used as the target model parameter.

Figure 6:
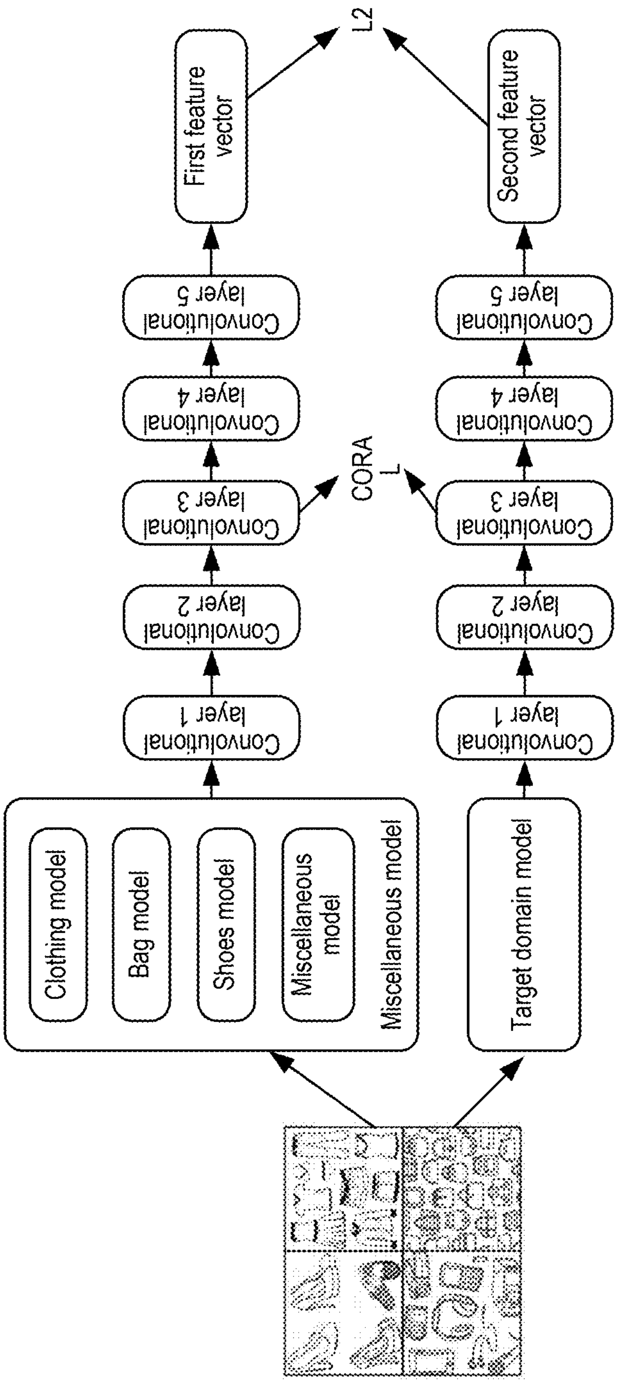
FIG. 6 is a block diagram illustrating the training of a target domain model according to some embodiments of the disclosure.

In an alternative embodiment, FIG. 6 is a block diagram illustrating the training of a target domain model. As illustrated in FIG. 6, the server inputs the sample image data into the source domain model and the target domain model, respectively, and obtains a calculation result of the loss function between the source domain model and the target domain model. As illustrated in FIG. 6, the calculation result of the loss function is related to two loss functions.

Specifically, the server first calculates a distance between the first feature vector and the second feature vector to obtain a first intermediate result, calculates a distance between a first covariance matrix and a second covariance matrix to obtain a second intermediate result, and finally acquires the calculation result based on the first intermediate result and the second intermediate result. The first feature vector is a feature vector generated after inputting the sample image data into a network model of a corresponding category in the source domain model, and the second feature vector is a feature vector generated after inputting the sample image data into the target domain model. The first covariance matrix is a covariance matrix of designated intermediate layer features in the source domain model, and the second covariance matrix is a covariance matrix of designated intermediate layer features in the target domain model.

In the above process, features obtained by performing feature extraction on the plurality of network models in the source domain model are used as the first feature vector $vec_{source}$, a feature obtained by performing feature extraction on the target domain model is used as the second target vector $vec_{target}$, and the first feature vector and the second feature vector are used as the parameters of an L2 loss function, and a calculation is performed to obtain the first intermediate result L_2, that is, L_2 satisfies the following formula:

$$L\_2 = E[\|vec_{source} - vec_{target}\|\text{^}2]$$

It should be noted that, via the L2 loss function, the feature vectors generated by the source domain model and the target domain model can ensure that the features extracted by the target domain model are as consistent as possible with those extracted by the source domain model.

In addition, the server obtains the second intermediate result by calculating the distance between the first covariance matrix and the second covariance matrix. Specifically, the server acquires the first covariance matrix from the designated intermediate layer of the network model of a category corresponding to the sample image data, acquires the second covariance matrix from the designated intermediate layer of the target domain model, and calculates and obtains the second intermediate result by using the first covariance matrix, the second covariance matrix, and a feature dimension of the designated intermediate layer.

Alternatively, as shown in FIG. 6, the designated intermediate layer is a convolutional layer. A CORrelation ALignment (CORAL) loss function is set in the designated intermediate layer of the category network model and the designated intermediate layer of the target domain model, and the distance between the source domain model and the target domain model in the same feature space is limited by aligning in second-order statistics so that the target domain model converges better. The second intermediate result satisfies the following formula:

$$L\_coral = (\|C\_source - C\_target\|\_F\text{^}2)/(4d\text{^}2)$$

In the above formula, L_coral is the second intermediate result, C_source and C_target represent the first covariance matrix and the second covariance matrix, respectively, and d is the feature dimension of the designated intermediate layer, wherein the intermediate convolutional layer feature may be pooled, and then mapped to 100 dimensions via a fully connected layer.

It should be noted that the designated intermediate layer may be a different layer, or a plurality of layers may be used.

Further, after the first intermediate result and the second intermediate result are obtained, the server may acquire the calculation result based on the first intermediate result and the second intermediate result. Specifically, the server calculates a product of a preset scale factor and the second intermediate result and then calculates a sum of the first intermediate result and the product to obtain the calculation result; that is, the calculation result satisfies the following formula:

$$L = L\_2 + \gamma L\_coral$$

In the above formula, L is the calculation result, and $\gamma$ is a parameter used between the L_2 loss function and the CORAL loss function.

By using the above method, the server can obtain the result and adjust the initial model parameters based on the calculation result to obtain the target model parameters, thereby implementing the training of the target domain model. After the target domain model is obtained, the server performs a prediction on the image under search based on the target domain model. Specifically, the server sets the image under search and the sample sets of commodities of a plurality of categories as input parameters, performs unified feature extraction processing to obtain a plurality of candidate results, then performs voting processing on the plurality of candidate results, and selects a category having the most votes as the prediction result.

Figure 7:
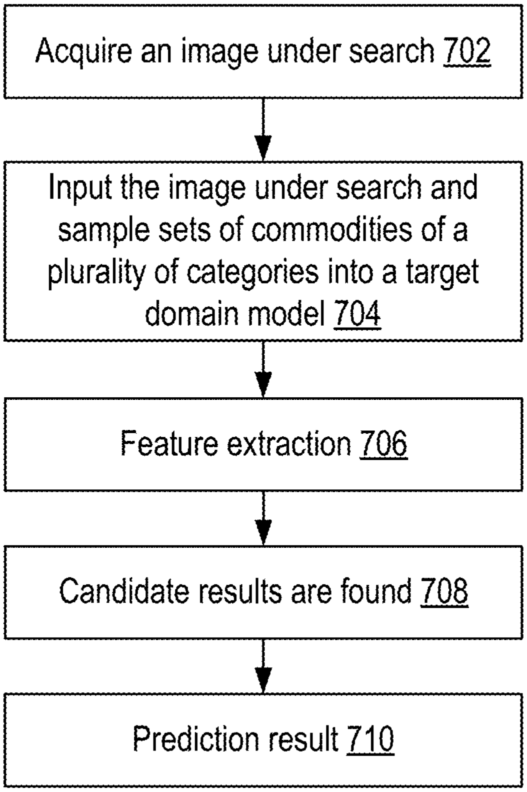
FIG. 7 is a block diagram of a neural network model training method according to some embodiments of the disclosure.

Alternatively, FIG. 7 is a block diagram of a neural network model training method. As illustrated in FIG. 7, after acquiring the image under search (702), the server inputs the image under search and the sample sets of commodities of a plurality of categories into the target domain model (704). The method then performs a unified feature extraction on the image under search (706) and the sample sets of commodities of a plurality of categories via the target domain model to obtain the plurality of candidate results, for example, 20 candidate results are found (708) by the search in FIG. 7, and the server performs voting processing (710) on the plurality of candidate results based on a K-Nearest Neighbor (KNN) algorithm to obtain the category having the most votes as the prediction result.

As illustrated from the above content, the solution provided by the disclosure can learn a unified target domain model for different commodity categories without sacrificing accuracy. This process only needs to store one model to extract features, which not only improves the storage efficiency of the system but also improves the generalization ability of the model. In addition, the disclosure uses a KNN searching method to perform a category prediction on the target domain model obtained by training. The KNN algorithm determines the category mainly by using limited nearby samples around, rather than using the method of determining the category domain, and therefore, for sample sets under classification having crossed or overlapped category domains, the KNN algorithm is more suitable than other methods and can complement the CNN model well.

To briefly describe each foregoing method embodiment, all the method embodiments are expressed as a combination of a series of actions, but those skilled in the art should know that the disclosure is not limited by the sequence of the described actions because certain steps can be applied with different sequences or can be carried out at the same time according to the disclosure. Secondly, those skilled in the art should also know that all the embodiments described in the description belong to preferred embodiments; the related actions and modules are not necessarily needed for the disclosure.

From the description of the above implementation, those skilled in the art can clearly understand that the prediction method for performing an image search according to the above embodiment can be implemented via software plus a necessary general hardware platform. Alternatively, it can also be implemented by hardware. Based on such understanding, the part of the technical solution of the disclosure that essentially or contributing to the prior art may be embodied in the form of a software product. The computer software product is stored in a storage medium (e.g., read-only memory (ROM)/RAM, a magnetic disk, and an optical disc etc.), including instructions for enabling a terminal device (which may be a mobile phone, a computer, a server, or a network device, etc.) to perform the methods described in the embodiments of the disclosure.

Embodiment 2

Figure 11:
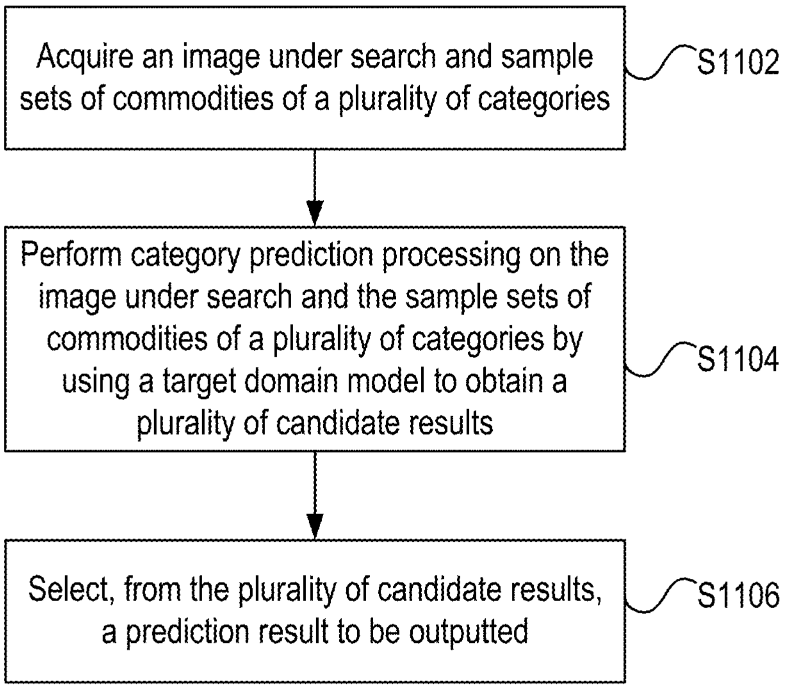
FIG. 11 is a flow diagram illustrating a prediction method for performing an image search according to some embodiments of the disclosure.

In one embodiment, a prediction method for performing an image search is further provided. It should be noted that, in this embodiment, a server may be used as the operator of this embodiment. As shown in FIG. 11, the method includes the following steps.

Step S1102: acquire an image under search and sample sets of commodities of a plurality of categories.

In an alternative embodiment, a user may input both of the image under search and the sample sets of commodities of a plurality of categories into the server via a terminal device (e.g., a computer) so that the server can obtain the image under search and the sample sets of commodities of a plurality of categories.

In another alternative embodiment, the user may input the image under search into the server via a terminal device (e.g., a computer), and at the same time, the server may acquire sample sets of commodities of a plurality of categories via the big data technology. In addition, the sample sets of commodities of a plurality of categories may also be stored in a preset storage server. When the server needs to perform a prediction on the image under search, the sample sets of commodities of a plurality of categories are directly acquired from the preset storage server.

Step S1104: perform category prediction processing on the image under search and the sample sets of commodities of a plurality of categories by using a target domain model to obtain a plurality of candidate results.

In step S1104, the target domain model is a network model obtained by training in which domain adaptation learning is performed using the source domain model, wherein the source domain model includes at least two network models, and the network models respectively correspond to different commodity categories. For example, in FIG. 4, the source domain model includes four network models: a clothing model, a shoe model, a bag model, and a miscellaneous model. In the disclosure, the server learns the above four network models into a unified model, i.e., the target domain model, via domain adaptation learning.

It should be noted that a plurality of network models may also correspond to the same commodity category. For example, the commodity category corresponding to a network model 1 and a network model 2 is clothing. In addition, a plurality of commodity categories may also correspond to the same network model. For example, a network model corresponding to commodity categories such as clothing, shoes, and bags may be an apparel network model, and a network model corresponding to commodity categories such as mobile phone, watch, camera, and computer may be a digital electronics network model.

In an alternative embodiment, after the server acquires the image under search and the sample sets of commodities of a plurality of categories, it uses the image under search and the sample sets of commodities of a plurality of categories as the input parameters for the target domain model and performs unified feature extraction on the image under search and the sample sets of commodities of a plurality of categories via the target domain model to obtain a plurality of candidate results. The plurality of candidate results may be commodities of categories, each having a feature similarity greater than a preset similarity, or may be commodities of top N selected categories sorted according to the feature similarities.

Step S1106: select, from the plurality of candidate results, a prediction result to be outputted.

In Step S1106, after the plurality of candidate results are obtained, the server may perform voting processing on the plurality of candidate results, select a category having the most votes as the prediction result, and output the prediction result to the terminal device. The user can intuitively acquire the prediction result corresponding to the image under search via a display screen of the terminal device.

Alternatively, the server may perform the voting processing on the plurality of candidate results based on a KNN algorithm to obtain the category having the most votes as the prediction result. In the KNN algorithm, if most of k nearest samples in a feature space of a sample belong to a certain category, the sample also belongs to this category and has features of the samples in this category. It can be easily noticed that the KNN algorithm determines the category mainly by using limited nearby samples around, rather than using the method of determining the category domain, and therefore, for sample sets under classification having crossed or overlapped category domains, the KNN algorithm is more suitable than other methods and can complement the CNN model well.

As illustrated from the above content, the disclosure uses a unified model for different commodity categories; that is, the disclosed embodiments use the target domain model to perform a prediction on the image under search. Compared with current systems, the disclosure not only improves the storage efficiency of the system but also improves the generalization ability of the target domain model. In addition, the disclosure does not use category prediction to determine a model for performing a prediction on the image under search, and instead, the disclosure uses domain self-learning to perform a prediction on the image under search by using sample sets of commodities of a plurality of categories. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search and further solving the technical problem of inaccurate prediction in the process of using category prediction methods to perform a prediction on an image in current systems.

In an alternative embodiment, the server needs to acquire the target domain model before performing a prediction on the image under search. Specifically, the server initializes the target domain model by using a model pre-trained by using an image data set to obtain initial model parameters, then inputs sample image data to the source domain model and target domain model respectively to acquire a calculation result of a loss function between the source domain model and the target domain model, and finally adjusts the initial model parameters based on the calculation result to obtain target model parameters. The loss function is used to control a distance between the source domain model and the target domain model in the same feature space.

It should be noted that in the above process, the calculation result may satisfy the following formula:

$$L = \mathrm{L\_2} + \gamma \mathrm{L\_coral}$$

where L is the calculation result, γ is the parameter used between the L2 loss function and the CORAL loss function, L_2 is the L2 loss function (i.e., the first intermediate result), and L_coral is the CORAL loss function (i.e., the second intermediate result).

Alternatively, L_2 satisfies the following formula:

$$\mathrm{L\_2} = E\left[\|\mathrm{vec}_{source} - \mathrm{vec}_{target}\ \|\hat{\ }2\right]$$

where $\mathrm{vec}_{source}$ is the first feature vector obtained by performing feature extraction on a plurality of network models in the source domain model, and $\mathrm{vec}_{target}$ is the second target vector obtained by performing feature extraction on the target domain model.

Alternatively, L_coral satisfies the following formula:

$$\mathrm{L\_coral} = \left(\|\mathrm{C\_source} - \mathrm{C\_target}\ \|\mathrm{\_F}\hat{\ }2\right)/\left(4d\hat{\ }2\right)$$

where C_source and C_target respectively represent the first covariance matrix acquired from the designated intermediate layer of the network model of the category corresponding to the sample image data and the second covariance matrix acquired from the designated intermediate layer of the target domain model, and d is a feature dimension of the designated intermediate layer.

It should be noted that, in this embodiment, the process of training the target domain model is the same as the training process involved in Embodiment 1. The relevant content has been described in Embodiment 1 and will not be repeated here.

Embodiment 3

Figure 12:
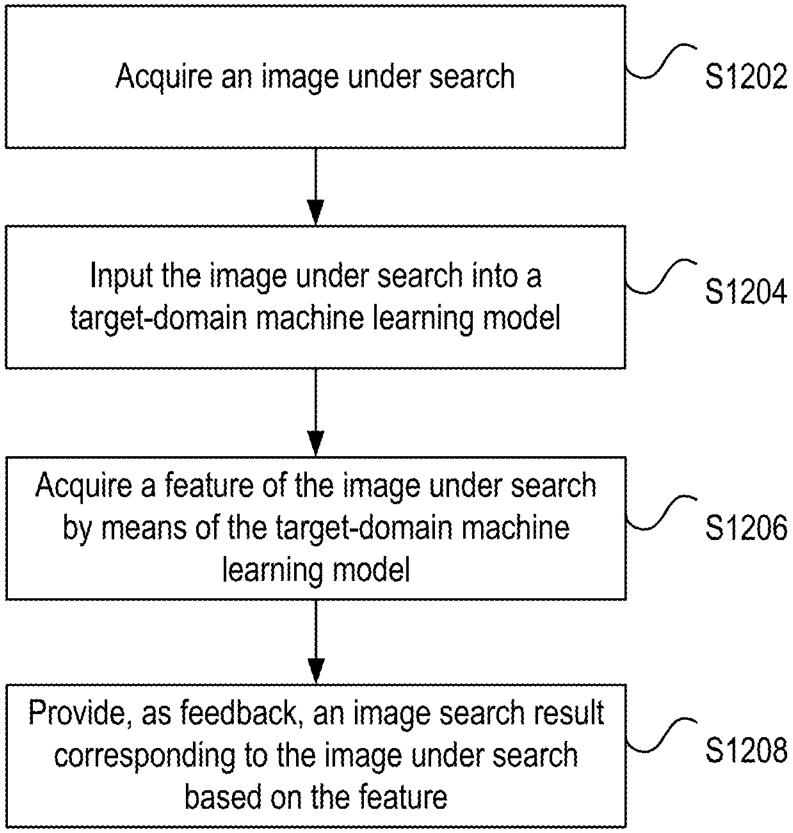
FIG. 12 is a flow diagram illustrating an image searching method according to some embodiments of the disclosure.

In one embodiment, an image searching method is further provided. It should be noted that, in this embodiment, a server may be used as the operator of this embodiment. As shown in FIG. 12, the method includes the following steps.

Step S1202: acquire an image under search.

In an alternative embodiment, a user may input the image under search into the server via a terminal device (e.g., a computer) so that the server can obtain the image under search.

In another alternative embodiment, the user may also send an address of the image under search to the server via the terminal device, and the server acquires the image under search from the address.

Step S1204: input the image under search into a target-domain machine learning model, wherein the target-domain machine learning model is generated by training at least based on a source-domain machine learning model.

In Step S1204: the target-domain machine learning model may be obtained by performing domain adaptation learning using the source-domain machine learning model, wherein the source-domain machine learning model includes at least two network models, and the network models respectively correspond to different commodity categories. For example, the source-domain machine learning model may include learning models such as a clothing model, a shoe model, a bag model, and a miscellaneous model.

It should be noted that a plurality of network models may also correspond to the same commodity category. For example, the commodity category corresponding to a network model 1 and a network model 2 is clothing. In addition, a plurality of commodity categories may also correspond to the same network model. For example, a network model corresponding to commodity categories such as clothing, shoes, and bags may be an apparel network model, and a network model corresponding to commodity categories such as mobile phone, watch, camera, and computer may be a digital electronics network model.

Step S1206: acquire a feature of the image under search via the target-domain machine learning model.

In step S1206, after the server inputs the image under search into the target-domain machine learning model, the target-domain machine learning model performs feature extraction on the image under search to obtain the feature of the image under search.

Step S1208: provide, as feedback, an image search result corresponding to the image under search based on the feature.

In step S1208, after the feature of the image under search is obtained, the server performs recognition processing on the feature of the image under search so as to obtain the image search result.

In an alternative embodiment, the server performs recognition processing on the feature of the image under search, a plurality of image search results can be obtained, then the server performs voting processing on the plurality of image search results, and uses an image search result having the most votes as a target search result corresponding to the image under search. The plurality of image search results may be commodities of categories, each having a feature similarity greater than a preset similarity, or may be commodities of top N selected categories sorted according to the feature similarities.

Alternatively, the server may perform the voting processing on the plurality of image search results based on a KNN algorithm to obtain the category having the most votes as the prediction result. In the KNN algorithm, if most of k nearest samples in a feature space of a sample belong to a certain category, the sample also belongs to this category and has features of the samples in this category. It can be easily noticed that the KNN algorithm determines the category mainly by using limited nearby samples around, rather than using the method of determining the category domain, and therefore, for sample sets under classification having crossed or overlapped category domains, the KNN algorithm is more suitable than other methods, and can complement the CNN model well.

As illustrated from the above content, the disclosure uses a unified model for different commodity categories. That is, the disclosed embodiments use the target-domain machine learning model to perform a prediction on the image under search. Compared with current systems, the disclosure not only improves the storage efficiency of the system but also improves the generalization ability of the target-domain machine learning model. In addition, the disclosure does not use category prediction to determine a model for performing a prediction on the image under search, and instead, the disclosure uses domain self-learning to perform a prediction on the image under search. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search, and further solving the technical problem of inaccurate prediction in the process of using category prediction methods to perform a prediction on an image in current systems.

It should be noted that in this embodiment, the process of training the target-domain machine learning model is the same as the method provided in Embodiment 1, and will not be repeated here.

Embodiment 4

Figure 13:
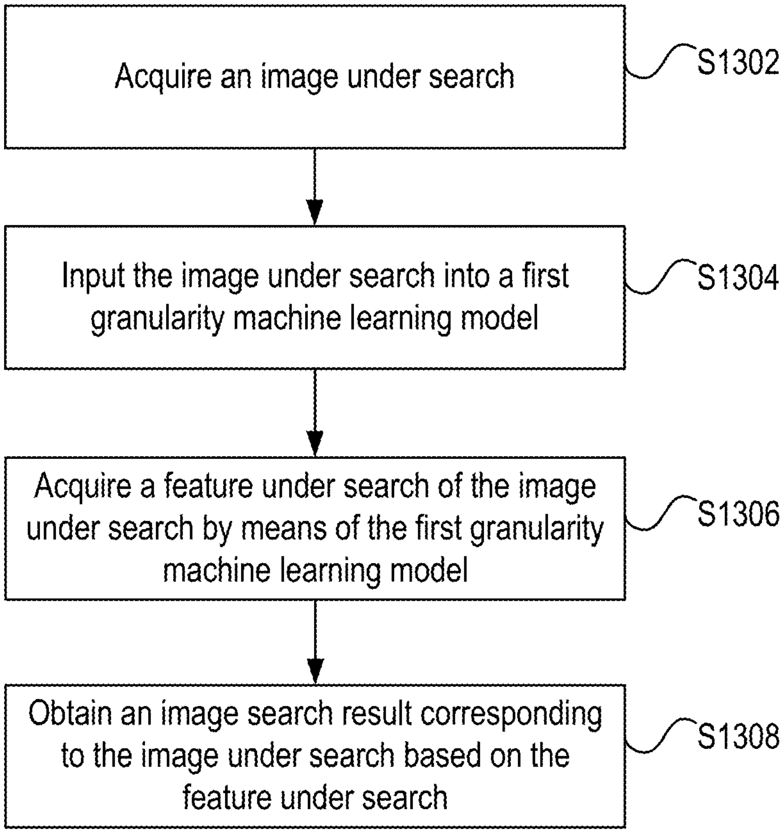
FIG. 13 is a flow diagram illustrating an image processing method according to some embodiments of the disclosure.

In one embodiment, an image processing method is further provided. It should be noted that, in this embodiment, a computing device may be used as the operator of this embodiment. As shown in FIG. 13, the method includes the following steps.

Step S1302: acquire an image under search.

In an alternative embodiment, the execution subject, i.e., the computing device of this embodiment, may be a terminal device (e.g., a computer), and a user may input the image under search into the computing device via an input component of the computing device so that the computing device can obtain the image under search. As in FIG. 14, a diagram of an image-based processing method is shown, the user inputs the image under search into the computing device, and the computing device can obtain the image under search, process the image under search, and then output a processed result.

In another alternative embodiment, the user may also send an address of the image under search to the server via the computing device, and the server acquires the image under search from the address and then sends the image under search to the computing device so that the computing device can acquire the image under search.

Step S1304: input the image under search into a first granularity machine learning model, wherein the first granularity machine learning model is generated by training at least based on a second granularity machine learning model, the second granularity machine learning model comprises a plurality of machine learning sub-models, and the machine learning sub-models respectively correspond to different commodity categories.

In Step S1304, the first granularity machine learning model may be but is not limited to the target domain model, and the second granularity machine learning model may be but is not limited to the source domain model.

In addition, the first granularity machine learning model may be obtained by performing domain adaptation learning using the second granularity machine learning model, wherein the second granularity machine learning model includes at least two network models, and the network models respectively correspond to different commodity categories. For example, the second granularity machine learning model may include learning models such as a clothing model, a shoe model, a bag model, and a miscellaneous model.

It should be noted that a plurality of network models may also correspond to the same commodity category. For example, the commodity category corresponding to a network model 1 and a network model 2 is clothing. In addition, a plurality of commodity categories may also correspond to the same network model. For example, a network model corresponding to commodity categories such as clothing, shoes, and bags may be an apparel network model, and a network model corresponding to commodity categories such as mobile phone, watch, camera, and computer may be a digital electronics network model.

Step S1306: acquire a feature under search of the image under search via the first granularity machine learning model.

Figure 14:
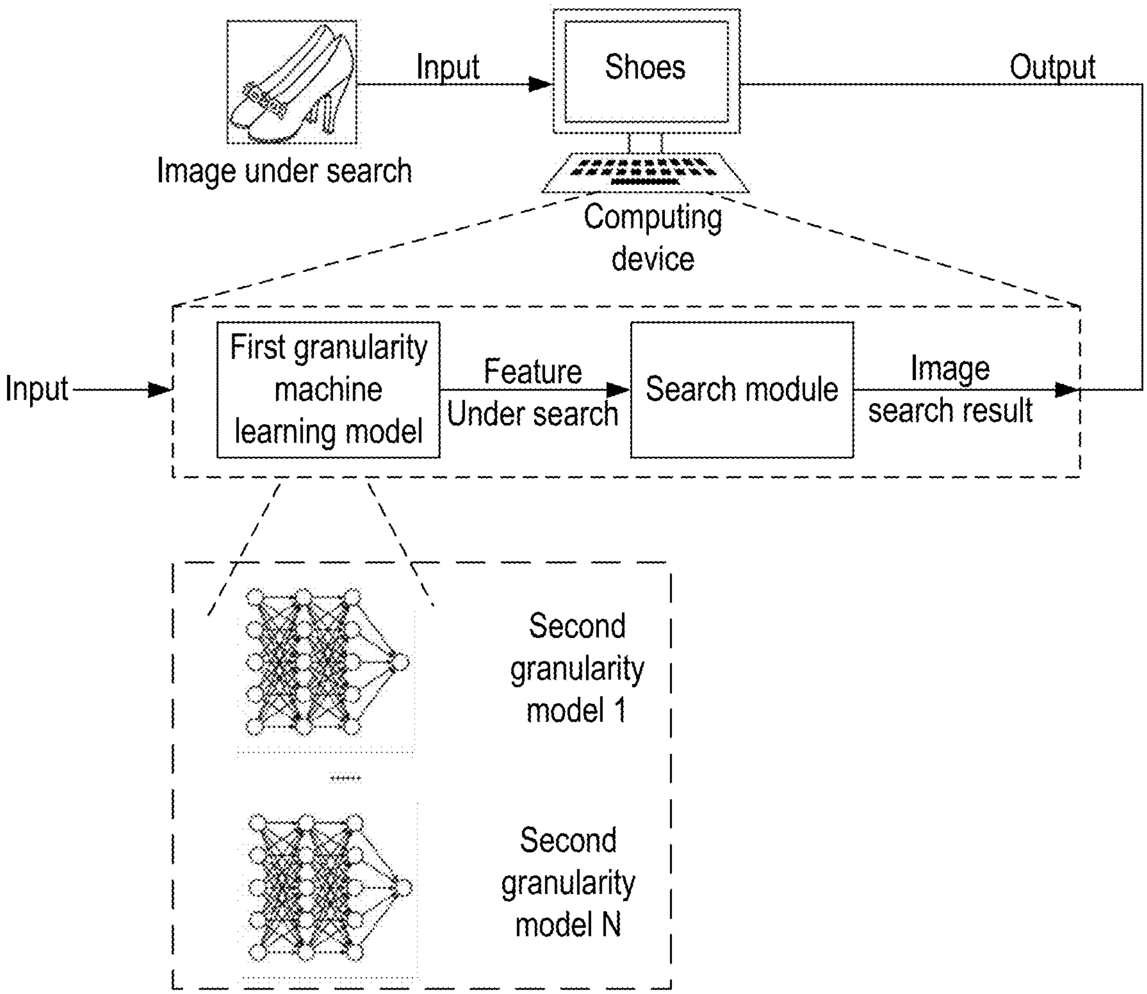
FIG. 14 is a flow diagram illustrating an image processing-based method according to some embodiments of the disclosure.

Alternatively, as shown in FIG. 14, after obtaining the image under search, the computing device inputs the image under search into the first granularity machine learning model, and then the first granularity machine learning model performs feature extraction on the image under search to obtain the feature of the image under search. As illustrated in FIG. 14, the first granularity machine learning model is generated by training using the second granularity machine learning model, wherein the second granularity machine learning model includes a plurality of machine learning sub-models, such as a second granularity machine learning model 1 and a second granularity machine learning model N in FIG. 14.

Step S1308: obtain an image search result corresponding to the image under search based on the feature under search.

Alternatively, as shown in FIG. 14, after obtaining the feature under search of the image under search, the computing device inputs the feature under search into a search module, so that the search module can perform recognition processing on the feature under search of the image under search, thereby obtaining the image search result.

In an alternative embodiment, the computing device performs recognition processing on the feature of the image under search, a plurality of image search results can be obtained, then the computing device performs voting processing on the plurality of image search results, and uses an image search result having the most votes as a target search result corresponding to the image under search. The plurality of image search results may be commodities of categories each having a feature similarity greater than a preset similarity, or may be commodities of top N selected categories sorted according to the feature similarities.

Alternatively, the computing device may perform the voting processing on the plurality of image search results based on a KNN algorithm to obtain the category having the most votes as the prediction result. In the KNN algorithm, if most of k nearest samples in a feature space of a sample belong to a certain category, the sample also belongs to this category and has features of the samples in this category. It can be easily noticed that the KNN algorithm determines the category mainly by using limited nearby samples around, rather than using the method of determining the category domain, and therefore, for sample sets under classification having crossed or overlapped category domains, the KNN algorithm is more suitable than other methods, and can complement the CNN model well.

Furthermore, as shown in FIG. 14, after the module under search obtains the image search result corresponding to the image under search based on the feature under search, the computing device outputs the image search result so that the user can intuitively view the image search result. For example, in FIG. 14, the computing device displays that the image search result corresponding to the image under search is shoes.

As illustrated from the above content, the disclosure uses a unified model for different commodity categories; that is, the disclosed embodiments use the first granularity machine learning model to perform a prediction on the image under search. Compared with current systems, the disclosure not only improves the storage efficiency of the system but also improves the generalization ability of the first granularity machine learning model. In addition, the disclosure does not use category prediction to determine a model for performing a prediction on the image under search, and instead, the disclosure uses domain self-learning to perform a prediction on the image under search. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search, and further solving the technical problem of inaccurate prediction in the process of using category prediction methods to perform a prediction on an image in current systems.

It should be noted that in this embodiment, the process of training the first granularity machine learning model is the same as the method of training the target domain model in Embodiment 1, and will not be repeated here.

Embodiment 5

Figure 15:
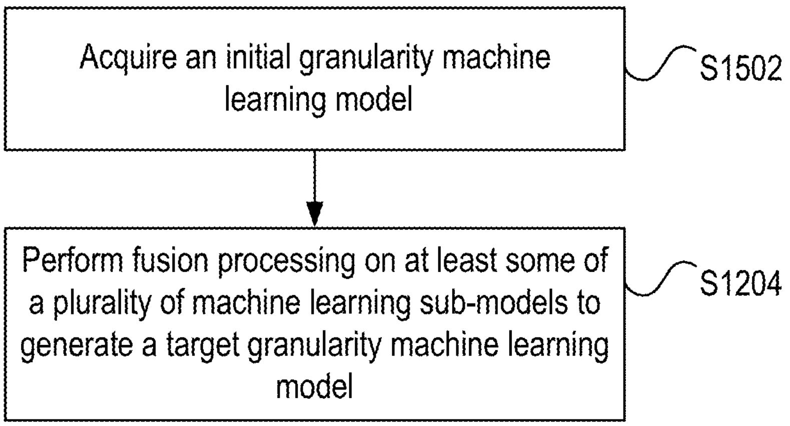
FIG. 15 is a flow diagram illustrating a network model fusion method according to some embodiments of the disclosure.

In one embodiment, a network model fusion method is further provided. It should be noted that, in this embodiment, a server may be used as the operator of this embodiment. As shown in FIG. 15, the method includes the following steps.

Step S1502: acquire an initial granularity machine learning model.

In step S1502, the initial granularity machine learning model includes a plurality of machine learning sub-models, and the machine learning sub-models respectively correspond to different commodity categories. For example, the initial granularity machine learning model may include machine learning sub-models such as a clothing model, a shoe model, a bag model, and a miscellaneous model. Alternatively, the initial granularity machine learning model may be, but is not limited to, a source domain model.

It should be noted that a plurality of machine learning sub-models may also correspond to the same commodity category. For example, commodity categories corresponding to a sub-model 1 and a sub-model 2 are clothing. In addition, a plurality of commodity categories may also correspond to the same machine learning sub-model. For example, a machine learning sub-model corresponding to commodity categories such as clothing, shoes, and bags may be an apparel model, and a sub-model corresponding to commodity categories such as mobile phone, watch, camera, and computer may be a digital electronics model.

Step S1504: perform fusion processing on at least some of the plurality of machine learning sub-models to generate a target granularity machine learning model, wherein the target granularity machine learning model is used to obtain an image search result corresponding to the image under search based on a feature under search in the image under search.

In Step S1504, the target granularity machine learning model may be, but is not limited to, a target domain model. Alternatively, the target granularity machine learning model may be obtained by performing domain adaptation learning using the initial granularity machine learning model.

It should be noted that the domain adaptation learning is a type of transfer learning, which can map data features in different domains to the same feature space. For example, the four sub-models including the clothing model, the shoe model, the bag model, and the miscellaneous model may be mapped to the target granularity machine learning model, which can effectively solve the problem of changes in data distribution among domains and reduce distribution differences among domains.

Furthermore, after obtaining the target granularity machine learning model, the computing device may input the image under search into the target granularity machine learning model, then obtain the feature under search of the image under search via the target granularity machine learning model, and finally obtain the image search result corresponding to the image under search based on the feature under search.

Alternatively, the computing device performs recognition processing on the feature of the image under search, a plurality of image search results can be obtained, then the computing device performs voting processing on the plurality of image search results, and uses an image search result having the most votes as a target search result corresponding to the image under search. The plurality of image search results may be commodities of categories each having a feature similarity greater than a preset similarity, or may be commodities of top N selected categories sorted according to the feature similarities.

As illustrated, in the disclosure, the domain adaptation learning is used to map a plurality of machine learning sub-models of the initial granularity machine learning model to the target granularity machine learning model, and therefore, there is no need to perform a category prediction on the image under search, thereby avoiding the problem of incorrect prediction results caused by category prediction errors.

As illustrated from the above content, the disclosure uses a unified model for different commodity categories. That is, the disclosed embodiments use the target granularity machine learning model to perform a prediction on the image under search. Compared with current systems, the disclosure not only improves the storage efficiency of the system but also improves the generalization ability of the target granularity machine learning model. In addition, the disclosure does not use category prediction to determine a model for performing a prediction on the image under search, and instead, the disclosure uses domain self-learning to perform a prediction on the image under search. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search, and further solving the technical problem of inaccurate prediction in the process of using category prediction methods to perform a prediction on an image in current systems.

In an alternative embodiment, fusion processing is performed on at least some of the plurality of machine learning sub-models, and a plurality of target granularity machine learning models may be generated. In this case, a selection needs to be performed from the plurality of target granularity machine learning models. Specifically, the server first performs the fusion processing on at least some of the plurality of machine learning sub-models to generate a plurality of candidate granularity machine learning models, then presents the plurality of candidate granularity machine learning models via a visual interface, and finally selects a target granularity machine learning model from the plurality of candidate granularity machine learning models in response to a control operation received by the visual interface.

Alternatively, if the quantity of machine learning sub-models is 8, the server may arbitrarily combine the eight machine learning sub-models to obtain a plurality of candidate granularity machine learning models. For example, the server may perform fusion processing on the eight machine learning sub-models to obtain a candidate granularity machine learning model. The server may also select one or a plurality of the eight machine learning sub-models, and then perform fusion processing on the selected machine learning sub-models to obtain other candidate granularity machine learning models.

Furthermore, after obtaining the plurality of candidate granularity learning models, the server may push the plurality of candidate granularity learning models to a computing device. The computing device has a display screen, the display screen can display a visual interface, and the visual interface can display the plurality of candidate granularity machine learning models. Therefore, the user can perform a selection from the plurality of alternative granularity machine learning models in the visual interface to obtain the target granularity machine learning model. Alternatively, the user may select the target granularity machine learning model from the plurality of candidate granularity machine learning models based on experiences or use requirements.

It should be noted that by manipulating the visual interface, the user can select a target granularity machine learning model that suits the requirements to perform an image search. Compared with current systems that can only use a single and fixed machine learning model, the solution provided in the disclosure is more flexible.

Embodiment 6

Figure 8:
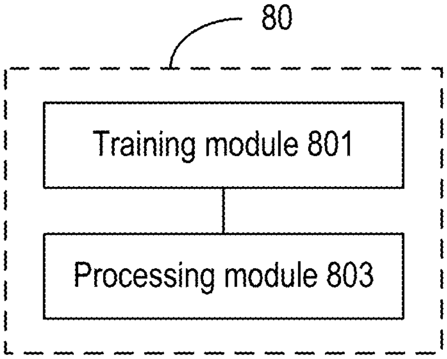
FIG. 8 is a diagram of a prediction apparatus for performing an image search according to some embodiments of the disclosure.

In one embodiment, a prediction apparatus for performing an image search for implementing the above prediction method for performing an image search is further provided. As shown in FIG. 8, the apparatus 80 includes a training module 801 and a processing module 803.

The training module 801 is configured to perform training in which domain adaptation learning is performed by using a source domain model to obtain a target domain model, wherein the source domain model includes at least two network models, and the network models respectively correspond to different commodity categories. The processing module 803 is configured to set an image under search and sample sets of commodities of a plurality of categories as input parameters for the target domain model to obtain a prediction result corresponding to the image under search.

It should be noted here that the above training module 801 and the processing module 803 correspond to Step S302 to Step S304 in Embodiment 1. The two modules implement the same examples and application scenarios as the corresponding steps, but are not limited to the content disclosed in Embodiment 1. It should be noted that, as a part of the apparatus, the above modules can run in the computing device 100 provided in Embodiment 1.

Alternatively, a plurality of network models correspond to the same commodity category, or a plurality of commodity categories correspond to the same network model.

In an alternative embodiment, the training module includes a first processing module, a first acquisition module, and an adjustment module. The first processing module is configured to initialize a target domain model by using a model pre-trained by using an image data set to obtain initial model parameters. The first acquisition module is configured to input sample image data into the source domain model and the target domain model respectively to obtain a calculation result of a loss function between the source domain model and the target domain model, wherein the loss function is used to control a distance between the source domain model and the target domain model in the same feature space. The adjustment module is configured to adjust the initial model parameters based on the calculation result to obtain target model parameters.

In an alternative embodiment, the first acquisition module includes a first calculation module, a second calculation module, and a second acquisition module. The first calculation module is configured to calculate a distance between a first feature vector and a second feature vector to obtain a first intermediate result, wherein the first feature vector is a feature vector generated after inputting the sample image data into a network model of a corresponding category in the source domain model, and the second feature vector is a feature vector generated after inputting the sample image data into the target domain model. The second calculation module is configured to calculate a distance between a first covariance matrix and a second covariance matrix to obtain a second intermediate result, wherein the first covariance matrix is a covariance matrix of designated intermediate layer features in the source domain model, and the second covariance matrix is a covariance matrix of designated intermediate layer features in the target domain model. The second acquisition module is configured to acquire the calculation result based on the first intermediate result and the second intermediate result.

In an alternative embodiment, the second calculation module includes a third acquisition module and a third calculation module. The third acquisition module is configured to acquire the first covariance matrix from a designated intermediate layer of a network model of a category corresponding to the sample image data, and acquire the second covariance matrix from a designated intermediate layer of the target domain model. The third calculation module is configured to calculate and obtain the second intermediate result by using the first covariance matrix, the second covariance matrix, and a feature dimension of the designated intermediate layer.

In an alternative embodiment, the second acquisition module includes a fourth calculation module and a fifth calculation module. The fourth calculation module is configured to calculate a product of a preset scale factor and the second intermediate result. The fifth calculation module is configured to calculate a sum of the first intermediate result and the product to obtain the calculation result.

In an alternative embodiment, the processing module includes a second processing module and a third processing module. The second processing module is configured to set the image under search and the sample sets of commodities of a plurality of categories as the input parameters, and perform unified feature extraction processing to obtain a plurality of candidate results. The third processing module is configured to perform voting processing on the plurality of candidate results, and select a category having the most votes as the prediction result.

Embodiment 7

Figure 9:
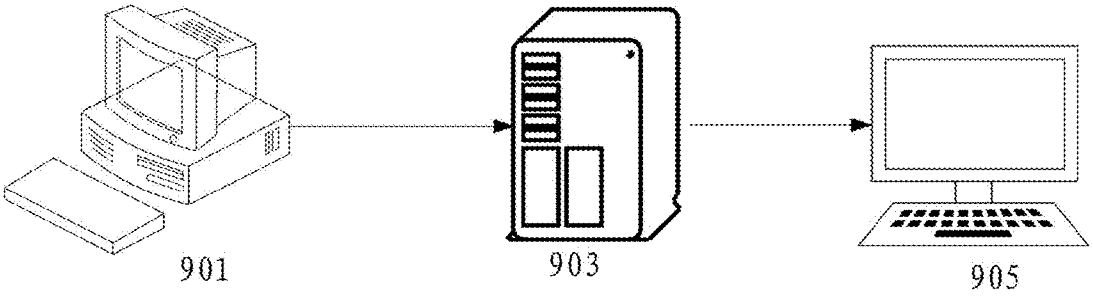
FIG. 9 is a block diagram of a prediction system for performing an image search according to some embodiments of the disclosure.

In one embodiment, a prediction system for performing an image search for implementing the above prediction method for performing an image search is further provided. As shown in FIG. 9, the system includes: an input device 901, a processing device 903, and a display device 905.

The input device is configured to input an image under search into a target domain model, wherein the target domain model is a model obtained by training in which domain adaptation learning is performed by using a source domain model, and the source domain model comprises at least two network models, and the network models respectively correspond to different commodity categories. The processing device is configured to perform a unified feature extraction on the image under search based on the target domain model to obtain a plurality of candidate results, perform voting processing on the plurality of candidate results, and select a category having the most votes as a prediction result corresponding to the image under search. The display device is configured to display the prediction result.

It should be noted that the above input device can be integrated with the display device. For example, the above input device and display device may be integrated in a PC having a display screen. In addition, the input device and the display device may also be two different devices.

As illustrated from the above, a target domain model is obtained by training in which a domain adaptation learning-based method is adopted to perform domain adaptation learning via a source domain model, and an image under search and sample sets of commodities of a plurality of categories are set as input parameters for the target domain model to obtain a prediction result corresponding to the image under search.

It can be easily noticed that the disclosure uses a unified model for different commodity categories. That is, the disclosed embodiments use the target domain model to perform a prediction on the image under search. Compared with current systems, the disclosure not only improves the storage efficiency of the system but also improves the generalization ability of the target domain model. In addition, the disclosure does not use category prediction to determine a model for performing a prediction on the image under search, and instead, the disclosure uses domain self-learning to perform a prediction on the image under search by using sample sets of commodities of a plurality of categories. Therefore, the disclosure can also avoid the problem of inaccurate prediction caused by using category prediction methods to perform a prediction on an image in current systems, thus improving the accuracy of the prediction.

As illustrated, the solution provided by the disclosure achieves the objective of accurately performing a prediction on the image under search, thereby achieving the technical effect of improving the accuracy of performing a prediction on the image under search, and further solving the technical problem of inaccurate prediction in the process of using category prediction methods to perform a prediction on an image in current systems.

It should be noted that the processing device in this embodiment can perform the prediction method for performing an image search in Embodiment 1. The relevant content has been described in Embodiment 1, and will not be repeated here.

Embodiment 8

A computing device may be provided In one embodiment, and the computing device may be any computing device in a computing device group. Alternatively, in this embodiment, the above computing device may also be replaced with a terminal device such as a mobile terminal.

Alternatively, in this embodiment, the above computing device may be located in at least one network device among a plurality of network devices in a computer network.

In this embodiment, the above computing device may execute program code of the following steps in the prediction method for performing an image search: performing training in which domain adaptation learning is performed by using a source domain model to obtain a target domain model, wherein the source domain model comprises at least two network models, and the network models respectively correspond to different commodity categories; and setting an image under search and sample sets of commodities of a plurality of categories as input parameters for the target domain model to obtain a prediction result corresponding to the image.

Figure 10:
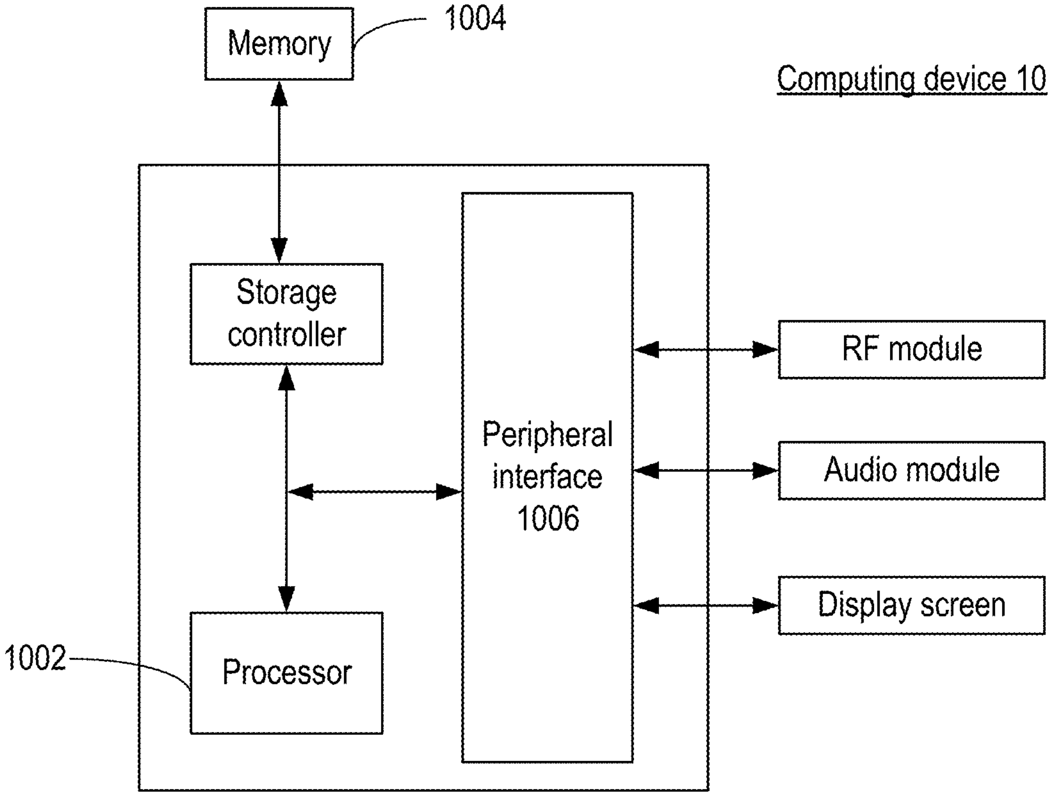
FIG. 10 is a block diagram of a computing device according to some embodiments of the disclosure.

Alternatively, FIG. 10 is a block diagram of a computing device according to some embodiments of the disclosure. As shown in FIG. 10, the computing device 100 may include one or a plurality of (only one is shown in the drawing) processors 1002, a memory 1004, and a peripheral interface 1006.

The memory may be configured to store software programs and modules, such as the program instructions/modules corresponding to the security vulnerability detection method and apparatus in the embodiments of the disclosure. The processor performs various function applications and data processing by running the software programs and modules stored in the memory, thereby implementing the above detection method for system vulnerability attack. The memory may include a high-speed RAM, and may also include non-volatile memory such as one or a plurality of magnetic storage apparatuses, a flash memory, or other non-volatile solid-state memories. In some examples, the memory may further include memories remotely provided with respect to the processor, and these remote memories may be connected to the computing device 100 via a network. Examples of the aforementioned network include, but are not limited to, the Internet, intranets, local area networks, mobile communication networks, and the combinations thereof.

The processor may call the information and application programs stored in the memory via the transmission apparatus to perform the following steps: performing training in which domain adaptation learning is performed by using a source domain model to obtain a target domain model, wherein the source domain model comprises at least two network models, and the network models respectively correspond to different commodity categories; and setting an image under search and sample sets of commodities of a plurality of categories as input parameters for the target domain model to obtain a prediction result corresponding to the image.

Alternatively, the above processor may also execute the program code of the following steps: initializing a target domain model by using a model pre-trained by using an image data set to obtain initial model parameters; inputting sample image data into the source domain model and the target domain model respectively to obtain a calculation result of a loss function between the source domain model and the target domain model, wherein the loss function is used to control a distance between the source domain model and the target domain model in the same feature space; and adjusting the initial model parameters based on the calculation result to obtain target model parameters.

Alternatively, the above processor may also execute the program code of the following steps: calculating a distance between a first feature vector and a second feature vector to obtain a first intermediate result, wherein the first feature vector is a feature vector generated after inputting the sample image data into a network model of a corresponding category in the source domain model, and the second feature vector is a feature vector generated after inputting the sample image data into the target domain model; calculating a distance between a first covariance matrix and a second covariance matrix to obtain a second intermediate result, wherein the first covariance matrix is a covariance matrix of designated intermediate layer features in the source domain model, and the second covariance matrix is a covariance matrix of designated intermediate layer features in the target domain model; and acquiring the calculation result based on the first intermediate result and the second intermediate result.

Alternatively, the above processor may also execute the program code of the following steps: acquiring the first covariance matrix from the designated intermediate layer of the network model of a category corresponding to the sample image data, acquiring the second covariance matrix from the designated intermediate layer of the target domain model, and calculating and obtaining the second intermediate result by using the first covariance matrix, the second covariance matrix, and a feature dimension of the designated intermediate layer.

Alternatively, the above processor may also execute the program code of the following steps: calculating a product of a preset scale factor and the second intermediate result; and calculating a sum of the first intermediate result and the product to obtain the calculation result.

Alternatively, the above processor may also execute the program code of the following steps: setting the image under search and the sample sets of commodities of a plurality of categories as the input parameters, and performing unified feature extraction processing to obtain a plurality of candidate results; and performing voting processing on the plurality of candidate results, and selecting a category having the most votes as the prediction result.

Those of ordinary skill in the art can understand that the structure shown in FIG. 10 is only for illustration, and the computing device may also be a terminal device such as a smartphone (e.g., an Android phone and an iOS phone), a tablet computer, a palmtop computer, and a mobile Internet device (MID), and a personal assistance device (PAD). FIG. 10 does not limit the structure of the above electronic apparatus. For example, the computing device 100 may also include more or fewer components (e.g., a network interface and a display apparatus) than those shown in FIG. 10, or have a configuration different from that shown in FIG. 10.

Those of ordinary skill in the art can understand that all or some of the steps in various methods in the above embodiments may be implemented through a program instructing hardware related to a terminal device. The program may be stored in a computer-readable storage medium. The storage medium may include a flash disk, a ROM, a RAM, a magnetic disk, or an optical disc.

Embodiment 9

A storage medium is further provided In one embodiment. Alternatively, in this embodiment, the above storage medium may be configured to store program code executed by the prediction method for performing an image search provided in Embodiment 1.

Alternatively, in this embodiment, the above storage medium may be located in any computing device in a computing device group in a computer network, or in any mobile terminal in a mobile terminal group.

Alternatively, in this embodiment, the storage medium is configured to store the program code for performing the following steps: performing training in which domain adaptation learning is performed by using a source domain model to obtain a target domain model, wherein the source domain model comprises at least two network models, and the network models respectively correspond to different commodity categories; and setting an image under search and sample sets of commodities of a plurality of categories as input parameters for the target domain model to obtain a prediction result corresponding to the image.

Alternatively, in this embodiment, the storage medium is configured to store the program code for performing the following steps: initializing a target domain model by using a model pre-trained by using an image data set to obtain initial model parameters; inputting sample image data into the source domain model and the target domain model respectively to obtain a calculation result of a loss function between the source domain model and the target domain model, wherein the loss function is used to control a distance between the source domain model and the target domain model in the same feature space; and adjusting the initial model parameters based on the calculation result to obtain target model parameters.

Alternatively, in this embodiment, the storage medium is configured to store program code for performing the following steps: calculating a distance between a first feature vector and a second feature vector to obtain a first intermediate result, wherein the first feature vector is a feature vector generated after inputting the sample image data into a network model of a corresponding category in the source domain model, and the second feature vector is a feature vector generated after inputting the sample image data into the target domain model; calculating a distance between a first covariance matrix and a second covariance matrix to obtain a second intermediate result, wherein the first covariance matrix is a covariance matrix of designated intermediate layer features in the source domain model, and the second covariance matrix is a covariance matrix of designated intermediate layer features in the target domain model; and acquiring the calculation result based on the first intermediate result and the second intermediate result.

Alternatively, in this embodiment, the storage medium is configured to store program code for performing the following steps: acquiring the first covariance matrix from the designated intermediate layer of the network model of a category corresponding to the sample image data, acquiring the second covariance matrix from the designated intermediate layer of the target domain model, and calculating and obtaining the second intermediate result by using the first covariance matrix, the second covariance matrix, and a feature dimension of the designated intermediate layer.

Alternatively, in this embodiment, the storage medium is configured to store program code for performing the following steps: calculating a product of a preset scale factor and the second intermediate result; and calculating a sum of the first intermediate result and the product to obtain the calculation result.

Alternatively, in this embodiment, the storage medium is configured to store program code for performing the following steps: setting the image under search and the sample sets of commodities of a plurality of categories as the input parameters, and performing unified feature extraction processing to obtain a plurality of candidate results; and performing voting processing on the plurality of candidate results, and selecting a category having the most votes as the prediction result.

The sequence numbers of the foregoing embodiments of the disclosure are merely for description and do not imply the preference among the embodiments.

In the embodiments of the disclosure, the description of each embodiment has its own focus; for the part not described in detail in one embodiment, reference can be made to the relevant description of other embodiments.

In the several embodiments provided in the disclosure, it should be understood that the disclosed technical content may be implemented in other manners. The apparatus embodiment described above is merely exemplary. For example, the division of the units is merely a logical function division; other divisions in practical implementation may exist, like a plurality of units or components can be combined or can be integrated into another system, or some features can be ignored or not executed. Additionally, the intercoupling, direct coupling, or communication connection displayed or discussed may be electrical or other forms through some interfaces, indirect coupling or communication connection of the units or the modules.

The units described as separate parts may or may not be physically separated, and the parts shown as units may or may not be physical units, which may be located in one place or may be distributed onto a plurality of network units. The objective of the solution of this embodiment may be achieved by selecting part or all of the units according to actual requirements.

In addition, various functional units in the embodiments of the disclosure may be integrated in one processing unit, or the units exist physically and separately, or two or more units are integrated in one processing unit. The integrated unit may be implemented in the form of hardware, and may also be implemented in the form of a software functional unit.

The integrated unit, if implemented in the form of a software functional unit and sold and sold or used as an independent product, may be stored in a computer-readable storage medium. Based on such understanding, the essence of the technical solutions of the disclosure or the part that makes contributions to the prior art, or all or part of the technical solutions may be embodied in the form of a software product. The computer software product is stored in a storage medium and includes several instructions for instructing a computer apparatus (which may be a personal computer, a server, a network apparatus, or the like) to perform all or part of the steps in the methods described in the embodiments of the disclosure. The storage medium includes a USB flash disk, a ROM, a RAM, a mobile hard disk drive, a magnetic disk, an optical disc, or any other medium that can store program code.

The above descriptions are merely preferred embodiments of the disclosure. It should be pointed out that those of ordinary skill in the art can make several improvements and modifications without departing from the principle of the disclosure, and the improvements and modifications should also be construed as falling within the protection scope of the disclosure.

What is claimed is:

1. A method comprising:

generating a target domain model using a domain adaptation training process, the domain adaptation training process comprising initializing the target domain model using a model pre-trained by an image dataset to obtain initial model parameters; calculating a first loss between feature vectors of a source domain model and target domain model; calculating a second loss between covariance matrices of designated intermediate layers of the source domain model and target domain model, the designated intermediate layers comprising feature maps from designated convolutional layers; and adjusting the initial model parameters based on a weighted combination of the first loss and second loss to obtain target model parameters, wherein the target domain model is a single unified neural network trained to process both query images and sample set images through a shared set of convolutional layers without maintaining separate network branches for different domains;

receiving an image under search from a computing device;

identifying sample sets of commodities of a plurality of categories the sample sets comprising representative images of commodities in each category;

inputting the image under search and the identified sample sets of commodities of the plurality of categories to the target domain model and executing unified feature extraction processing on both the image under search and the sample sets through the shared set of convolutional layers of the target domain model to generate a plurality of candidate prediction results, wherein each candidate prediction result comprises a commodity category and a feature similarity score computed between a feature vector extracted from the image under search and a feature vector extracted from a respective sample set image;

performing voting processing on the plurality of candidate prediction results based on the feature similarity scores to select a category having a highest number of votes;

returning a prediction result output by the target domain model to the computing device;

classifying the image under search into a sample set corresponding to the predicted category; and storing the image under search in a database associated with the predicted category for subsequent retrieval.

2. The method of claim 1, wherein at least one of the at least two network models corresponds to multiple commodity categories.

3. The method of claim 1, wherein the at least two network models correspond to a same commodity category.

4. The method of claim 1, wherein generating a target domain model comprises:

initializing the target domain model using a model pre-trained by an image data set to obtain initial model parameters;

inputting sample image data into the source domain model and the target domain model respectively to obtain a calculation result of a loss function between the source domain model and the target domain model, the loss function controlling a distance between the source domain model and the target domain model in the same feature space; and adjusting the initial model parameters based on the calculation result to obtain target model parameters.

5. The method of claim 4, wherein inputting the sample image data into the source domain model and the target domain model respectively to obtain the calculation result comprises:

calculating a distance between a first feature vector and a second feature vector to obtain a first intermediate result, the first feature vector generated after inputting the sample image data into a network model of a corresponding category in the source domain model, and the second feature vector generated after inputting the sample image data into the target domain model;

calculating a distance between a first covariance matrix and a second covariance matrix to obtain a second intermediate result, the first covariance matrix comprising a covariance matrix of designated intermediate layer features in the source domain model, and the second covariance matrix comprising a covariance matrix of designated intermediate layer features in the target domain model; and acquiring the calculation result based on the first intermediate result and the second intermediate result.

6. The method of claim 5, the calculating the distance between the first covariance matrix and the second covariance matrix to obtain the second intermediate result comprising:

acquiring the first covariance matrix from a designated intermediate layer of a network model of a category corresponding to the sample image data, and acquiring the second covariance matrix from a designated intermediate layer of the target domain model; and calculating and obtaining the second intermediate result using the first covariance matrix, the second covariance matrix, and a feature dimension of the designated intermediate layer.

7. The method of claim 5, the obtaining the calculation result based on the first intermediate result and the second intermediate result comprising:

calculating a product of a preset scale factor and the second intermediate result; and calculating a sum of the first intermediate result and the product to obtain the calculation result.

8. A non-transitory computer-readable storage medium for tangibly storing computer program instructions capable of being executed by a computer processor, the computer program instructions defining the steps of:

generating a target domain model using a domain adaptation training process, the domain adaptation training process comprising initializing the target domain model using a model pre-trained by an image dataset to obtain initial model parameters; calculating a first loss between feature vectors of a source domain model and target domain model; calculating a second loss between covariance matrices of designated intermediate layers of the source domain model and target domain model, the designated intermediate layers comprising feature maps from designated convolutional layers; and adjusting the initial model parameters based on a weighted combination of the first loss and second loss to obtain target model parameters, wherein the target domain model is a single unified neural network trained to process both query images and sample set images through a shared set of convolutional layers without maintaining separate network branches for different domains;

receiving an image under search from a computing device;

identifying sample sets of commodities of a plurality of categories the sample sets comprising representative images of commodities in each category;

inputting the image under search and the identified sample sets of commodities of the plurality of categories to the target domain model and executing unified feature extraction processing on both the image under search and the sample sets through the shared set of convolutional layers of the target domain model to generate a plurality of candidate prediction results, wherein each candidate prediction result comprises a commodity category and a feature similarity score computed between a feature vector extracted from the image under search and a feature vector extracted from a respective sample set image;

performing voting processing on the plurality of candidate prediction results based on the feature similarity scores to select a category having a highest number of votes;

returning a prediction result output by the target domain model to the computing device;

classifying the image under search into a sample set corresponding to the predicted category; and storing the image under search in a database associated with the predicted category for subsequent retrieval.

9. The computer-readable storage medium of claim 8, wherein at least one of the at least two network models corresponds to multiple commodity categories.

10. The computer-readable storage medium of claim 8, wherein the at least two network models correspond to a same commodity category.

11. The computer-readable storage medium of claim 8, wherein generating a target domain model comprises:

initializing the target domain model using a model pre-trained by an image data set to obtain initial model parameters;

inputting sample image data into the source domain model and the target domain model respectively to obtain a calculation result of a loss function between the source domain model and the target domain model, the loss function controlling a distance between the source domain model and the target domain model in the same feature space; and adjusting the initial model parameters based on the calculation result to obtain target model parameters.

12. The computer-readable storage medium of claim 11, wherein inputting the sample image data into the source domain model and the target domain model respectively to obtain the calculation result comprises:

calculating a distance between a first feature vector and a second feature vector to obtain a first intermediate result, the first feature vector generated after inputting the sample image data into a network model of a corresponding category in the source domain model, and the second feature vector generated after inputting the sample image data into the target domain model;

calculating a distance between a first covariance matrix and a second covariance matrix to obtain a second intermediate result, the first covariance matrix comprising a covariance matrix of designated intermediate layer features in the source domain model, and the second covariance matrix comprising a covariance matrix of designated intermediate layer features in the target domain model; and acquiring the calculation result based on the first intermediate result and the second intermediate result.

13. The computer-readable storage medium of claim 12, the calculating the distance between the first covariance matrix and the second covariance matrix to obtain the second intermediate result comprising:

acquiring the first covariance matrix from a designated intermediate layer of a network model of a category corresponding to the sample image data, and acquiring the second covariance matrix from a designated intermediate layer of the target domain model; and calculating and obtaining the second intermediate result using the first covariance matrix, the second covariance matrix, and a feature dimension of the designated intermediate layer.

14. The computer-readable storage medium of claim 12, the obtaining the calculation result based on the first intermediate result and the second intermediate result comprising:

calculating a product of a preset scale factor and the second intermediate result; and calculating a sum of the first intermediate result and the product to obtain the calculation result.

15. A device comprising:

a processor; and a storage medium for tangibly storing thereon program logic for execution by the processor, the stored program logic comprising:

logic, executed by the processor, for generating a target domain model using a domain adaptation training process, the domain adaptation training comprising initializing the target domain model using a model pre-trained by an image dataset to obtain initial model parameters; calculating a first loss between feature vectors of a source domain model and target domain model; calculating a second loss between covariance matrices of designated intermediate layers of the source domain model and target domain model, the designated intermediate layers comprising feature maps from designated convolutional layers; and adjusting the initial model parameters based on a weighted combination of the first loss and second loss to obtain target model parameters, wherein the target domain model is a single unified neural network trained to process both query images and sample set images through a shared set of convolutional layers without maintaining separate network branches for different domains;

logic, executed by the processor, for receiving an image under search from a computing device;

logic, executed by the processor, for identifying sample sets of commodities of a plurality of categories, the sample sets comprising representative images of commodities in each category;

logic, executed by the processor, for inputting the image under search and the identified sample sets of commodities of the plurality of categories to the target domain model and executing unified feature extraction processing on both the image under search and the sample sets through the shared set of convolutional layers of the target domain model to generate a plurality of candidate prediction results, wherein each candidate prediction result comprises a commodity category and a feature similarity score computed between a feature vector extracted from the image under search and a feature vector extracted from a respective sample set image;

logic, executed by the processor, for performing voting processing on the plurality of candidate prediction results based on the feature similarity scores to select a category having a highest number of votes;

logic, executed by the processor, for returning a prediction result output by the target domain model to the computing device;

logic, executed by the processor, for classifying the image under search into a sample set corresponding to the predicted category; and logic, executed by the processor, for storing the image under search in a database associated with the predicted category for subsequent retrieval.

16. The device of claim 15, wherein at least one of the at least two network models corresponds to multiple commodity categories.

17. The device of claim 15, wherein the at least two network models correspond to a same commodity category.

18. The device of claim 15, wherein generating a target domain model comprises:

initializing the target domain model using a model pre-trained by an image data set to obtain initial model parameters;

inputting sample image data into the source domain model and the target domain model respectively to obtain a calculation result of a loss function between the source domain model and the target domain model, the loss function controlling a distance between the source domain model and the target domain model in the same feature space; and adjusting the initial model parameters based on the calculation result to obtain target model parameters.

19. The device of claim 18, wherein inputting the sample image data into the source domain model and the target domain model respectively to obtain the calculation result comprises:

calculating a distance between a first feature vector and a second feature vector to obtain a first intermediate result, the first feature vector generated after inputting the sample image data into a network model of a corresponding category in the source domain model, and the second feature vector generated after inputting the sample image data into the target domain model;

calculating a distance between a first covariance matrix and a second covariance matrix to obtain a second intermediate result, the first covariance matrix comprising a covariance matrix of designated intermediate layer features in the source domain model, and the second covariance matrix comprising a covariance matrix of designated intermediate layer features in the target domain model; and acquiring the calculation result based on the first intermediate result and the second intermediate result.

20. The device of claim 19, the calculating the distance between the first covariance matrix and the second covariance matrix to obtain the second intermediate result comprising:

acquiring the first covariance matrix from a designated intermediate layer of a network model of a category corresponding to the sample image data, and acquiring the second covariance matrix from a designated intermediate layer of the target domain model; and calculating and obtaining the second intermediate result using the first covariance matrix, the second covariance matrix, and a feature dimension of the designated intermediate layer.

* * * * *